(12) United States Patent
LaWhite et al.

(10) Patent No.: US 8,456,955 B2
(45) Date of Patent: *Jun. 4, 2013

(54) HOUSINGS FOR PHASED ARRAY MONOSTATIC SODAR SYSTEMS

(75) Inventors: Niels LaWhite, Somerville, MA (US); Louis Manfredi, Amherst, MA (US); Walter L. Sass, Somerville, MA (US)

(73) Assignee: Second Wind Systems, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,473

(22) Filed: Apr. 10, 2012

(65) Prior Publication Data

US 2012/0218866 A1    Aug. 30, 2012

Related U.S. Application Data

(63) Continuation of application No. 12/125,166, filed on May 22, 2008, now Pat. No. 8,174,930, which is a continuation-in-part of application No. 11/934,915, filed on Nov. 5, 2007, now Pat. No. 8,009,513.

(60) Provisional application No. 60/941,302, filed on Jun. 1, 2007.

(51) Int. Cl.
*E04B 1/84* (2006.01)

(52) U.S. Cl.
USPC .................. 367/90; 73/170.13; 73/861.25

(58) Field of Classification Search
USPC .................. 367/90; 73/170.13, 861.25
See application file for complete search history.

(56) References Cited

U.S. PATENT DOCUMENTS

| | | | |
|---|---|---|---|
| 5,509,304 A * | 4/1996 | Peterman et al. | 73/170.13 |
| 6,427,531 B1 * | 8/2002 | Chintawongvanich | 73/170.13 |
| 8,174,930 B2 * | 5/2012 | Lawhite et al. | 367/90 |

* cited by examiner

*Primary Examiner* — Ian Lobo
(74) *Attorney, Agent, or Firm* — Dingman IP Law, PC; Brian M. Dingman

(57) ABSTRACT

A housing for a phased array monostatic sodar system with a transducer array that sequentially emits and receives a set of sound beams along different primary axes. The housing includes an enclosure having a plurality of sidewalls, each sidewall of the plurality of sidewalls having an inner surface, the enclosure configured to emit and receive the set of sound beams. Each inner surface of each sidewall of the plurality of sidewalls defines at least a partially elliptical cross-section configured to substantially envelop at least a portion of an angled, conical sound beam of the set of sound beams.

20 Claims, 18 Drawing Sheets

HOUSINGS FOR PHASED ARRAY MONOSTATIC SODAR SYSTEMS

CROSS REFERENCE TO RELATED APPLICATIONS

This application is a continuation of U.S. patent application Ser. No. 12/125,166, filed on May 22, 208 which is continuation in part of U.S. patent application Ser. No. 11/934,915, filed on Nov. 5, 2007, and which claims priority to U.S. Provisional Patent Application Ser. No. 60/941,302, filed on Jun. 1, 2007. The entire disclosures of each of these applications are incorporated herein by reference.

FIELD OF THE INVENTION

The present invention relates to a sonic detection and ranging (sodar) system.

BACKGROUND OF THE INVENTION

Sodar systems employ sound waves to detect atmospheric phenomena such as wind speed. A monostatic sodar operates by transmitting directional sound pulses and detecting reflected signals from a single apparatus. Phased-array monostatic sodars employ groups of acoustic transducers to emit and receive sound beams in different directions by electronic means. This is accomplished by varying the phase of transmitted signals from the individual transducers comprising the array and by varying the phase of the sampling process such that the transducers detect the signals reflected back from the atmosphere. The array itself remains physically motionless in operation. This approach is described in U.S. Pat. No. 4,558,594, the disclosure of which is incorporated herein by reference.

The phased array approach has the benefit that the directional power density of transmitted signals, and the directional sensitivity of the array to received signals, have a primary beam width which is extremely narrow compared to what is possible with a single transducer, and which can, with appropriate electronics, be oriented in a variety of directions.

Monostatic sodar systems typically use an array of transducers arranged in a rectangular grid packing arrangement such that the transducers are aligned in rows and columns, as shown in FIGS. 2, 4 and 5 of the U.S. Pat. No. 4,558,594 patent. These arrays are operated so that they emit three sequential beams, one normal to the plane of the array, and two tilted in altitude relative to the array and 90 degrees from one another in azimuth. The rectangular grid packing arrangement, with circular transducers, leaves about 27% of the array as open space, which results in non-uniformity of sound pressure across the array, leading to potential measurement errors. Also, this inherently reduces the maximum intensity of the sound pressure, which reduces the array accuracy and sensitivity. Further, the use of asymmetric sound beams results in asymmetric sensing, which causes measurement and calculation errors.

Phased arrays ideally produce controllably aimed, sharply delineated directional cones of sound when transmitting, and equivalently shaped cones of sensitivity when receiving. In reality such arrays suffer from deficiencies. For example, the cones are not perfectly delineated by a well-defined boundary; intensity gradually drops as the angle off the main beam axis increases. Also, the cones are not perfectly shaped, but deviate from perfectly circular contours of equal sound intensity centered on the main beam axis. Further, sound transmission and reception is not entirely within the intended cones, but includes intensity outside of the intended cone of both a directionally focused and a quasi-omnidirectional nature.

The amount of sound energy radiated in undesired directions can be minimized by several techniques, including optimizing the number and physical arrangement of the individual transducers. Unfortunately it is understood that the phased array approach in and of itself cannot create a perfect directional beam. Using a practical number of transducers, the array inevitably emits sound in transmit mode, and is sensitive to sound in receive mode, in a number of directions other than the desired beam direction. For example, one or more side lobe beams are generated. Such side lobes are not as strong in transmission or sensitive in reception as the main beam, but are intense enough to degrade the performance of the sodar. These side lobes are predicted by theoretical modeling, and their existence is confirmed by experimentation.

Also, the main beam intensity does not abruptly, or even monotonically, drop to a background level as the angle of measurement deviates from the beam center axis. Instead, intensity drops to a first null, then increases somewhat from this null to a higher level, then drops to a second null, and so on. This results in the main beam being surrounded by one or more annular "rings" of sound, at angles to the main beam axis. These annular rings are also intense enough to degrade the operation performance of the sodar. Like the side lobes, these annuli are also predicted by theoretical modeling and confirmed by experimental measurement.

Further, additional signal intensity is spread out at varying small levels in all directions, likely consisting of complex combinations of the side lobes and the annular rings, as well as imperfections due to variations in transducer sensitivity, geometric accuracy of the sensor array, and variations or imperfections of other aspects of the sodar system.

Practical phased-array sodars are usually surrounded by an open-ended enclosure. Enclosures implemented in prior designs are typically fabricated from flat panel materials. Such enclosures can perform adequately as windscreens for the transducer. However, they do little, if anything, to limit the intensity of off-axis transmission and reception for the broad range of angles which are neither in the direction of the desired beam nor nearly horizontal.

Many examples of prior art have straight sharp edges on the upper lips of the housing. A sharp edge in this location will form a surface about which a portion of the outbound sound waves can be refracted to an undesirable, near horizontal, direction. Likewise, interfering noise originating from sources, or reflected from objects, near the ground might be refracted by such a sharp edge to arrive at the transducer array in receive mode and interfere with detection of the desired echo signals. Other examples of prior art employ triangular scalloping of the upper edge profile of the housing, or "thnadners," to limit refraction of sounds in and out of the housing at near-horizontal angles.

SUMMARY OF THE INVENTION

The invention benefits from an arrangement or array of acoustic transducers for a sodar system, and a system and method of operating the array to accomplish improved atmospheric detection. In one aspect, the invention contemplates grouping an array of acoustic transducers in a generally hexagonal grid packing arrangement instead of a conventional rectangular grid packing arrangement. For reasons discussed in a parent patent application Ser. No. 11/934,915, such a hexagonal array has advantages of its own, and it is expedient to describe the present housing invention in the context of a hexagonal array sodar. However, it will be readily apparent to one skilled in the art, that the present housing design and design technique could be equally well adapted to other types of sodars, including conventional rectangular grid monostatic phased array sodars, in which the transducers are arranged in a rectangular grid array. Indeed, in such rectangular grid array units the benefits from the inventive shaped housing might be as great, or greater than the benefits of a shaped housing for a hexagonal array, since such rectangular grid arrays have comparatively poorer directionality and hence more room for improvement.

In another aspect, the invention contemplates operating the transducers as a phased array operated sequentially in three orientations of rows that are 120° apart, instead of two orientations of rows that are 90° apart. This operation accomplishes three sequential sound beams with their principal axes spaced apart from one another 120° in azimuth. Preferably, the beams are each at the same elevation. The result is that the principal axes of the three beams are evenly spaced around the surface of a virtual vertically oriented cone with its apex proximate the center of the array.

Preferably, transducers with symmetric (circular) actuators and horns are employed in the housing of the invention, so that there is no inherent directionality with each transducer. One advantage of the array is that the generally hexagonal grid packing arrangement creates an array in which the area encompassed by each transducer approximates the circular shape of the transducer actuators, the transducer horns, and the acoustical dispersion patterns associated with them. This transducer packing arrangement inherently reduces the undesirable acoustic characteristics of the spaces between the horns, which improves the uniformity of sound pressures across the front of the array. Improved uniformity reduces emanations of sound beyond the perimeter of the directed beams, and symmetrically also reduces the sensitivity of the array in receive mode to off-beam sounds.

Another advantage is that the generally hexagonal transducer grid packing arrangement allows more transducers to be employed in a given area than is allowed by rectangular grid packing arrangement of the transducers, in which the transducers are aligned in rows and columns. The transducer packing density of the hexagonal array also improves the uniformity and intensity of sound pressure across the front of the array.

Another advantage is that the operation of the array that is physically symmetric along each of the azimuthal directions along which beams are propagated, with three beams orientated 120° apart, makes sodar operations based on three sequential sound beams physically symmetric. This allows the sodar enclosure to be shaped symmetrically, which in turn produces sound beams, both transmitted and received, that are shaped symmetrically. Thus, distortions created by interactions with the enclosure are inherently applied to all three orientations. This reduces measurement and calculation errors from asymmetric operation.

Yet another advantage is that the operation of the array, with three beams orientated 120° apart, allows for a maximum angle between the centers of the various beams, for any particular maximum angle between the center of any one beam and the zenith. Since increasing the angle between the various beams increases accuracy, while increasing the angle between each beam and the zenith detracts from accuracy and reliability of data capture due to atmospheric effects, this configuration has improved accuracy and data capture relative to the prior art.

The invention includes an open-ended structure shaped to envelop at least portions of the multiple desired beams and corresponding cones of sensitivity of the sodar. The shape is preferably formed to surround at least portions of these desired beams as closely as possible without actually impinging upon them. In the preferred embodiment the upper lip of the enclosure is rounded with a relatively large radius. The invention provides greatly improved performance over prior art flat-sided enclosures with rectangular openings; both act as windscreens to prevent wind from blowing directly on the transducer array, which would create undesirable noise that can drown out the relatively faint returned signals. However, the inventive housing does so in a way that generates less similarly undesirable noise from the wind blowing over the opening of the housing. Also, the inventive housing has benefits which the flat sided enclosures lack or which the flat sided enclosures have to a much lesser degree than the inventive housing. Also, by lining the enclosure with sound absorbing material, sound damping is provided. This limits reverberation of the beam and reflection of the beam in undesirable directions. The enclosure also blocks sounds from near-horizontal sources when in receive mode. Such sounds may include road noise, and noises from insects and animals. These unwanted noises can seriously interfere with detecting the returned signals. Enclosures also block near-horizontal sound emanations from the arrays when in transmit mode. Such sound emanations can be objectionable. Also, if combined with a reflecting surface for the sound beams, the array can be mounted vertically, or nearly so. This provides protection to the transducer array from incident precipitation. In addition, the inventive enclosure also provides further benefits, including substantially blocking non-horizontal off-axis emanations from the array in transmit mode, and substantially blocking reception of non-horizontal off-axis sounds from the array in receive mode.

The inventive enclosure has at least the following advantages. For one, it reduces the tendency of the phased array to emanate sound in, and be sensitive to sound from, the broad range of directions between horizontal and the intended zones of measurement, which may be close to vertical. This in turn reduces the likelihood of various common sources of measurement errors, including reception of echoes from sound transmitted to, and echoed back from, nearby trees, buildings, towers, and other structures or terrain features. The reception of noise from external sources including building ventilation systems, wildlife such as crickets and frogs, and road traffic, is also reduced. Sounds from such sources are often close to the frequency spectrum typically used by sodar (around 4000 Hz) and present highly objectionable interference to the detection of faint return signals. To a great extent such noise sources are concentrated at lower elevations outside the desired main beam, but even were they uniformly distributed in direction, substantially blocking sounds in all directions except that of the desired beam will attenuate the overall intensity of such interference. This also reduces reception of unwanted noises produced at various distances that "skip" or refract off the atmosphere, and arrive at incident angles between horizontal and vertical. It also increases the probability that the atmospheric phenomena that the reflections come from are within the intended conic volume. For some applications of sodar, most particularly for the measurement of horizontal wind velocity, accuracy critically depends on receiving echoes from the intended volume of air. It is even more critical to know with some accuracy which volume of air an echo returned from, even if that volume is not exactly, but is only approximately, the intended volume. It also decreases the likelihood, for any particular sound intensity of the main transmitted beam, of sodar emissions being an audible nuisance via reflections and scattering from lower-than-intended angles. Because of this, it is possible to transmit a more intense signal than would otherwise be possible, allowing the system to operate in conditions where the returned signal might otherwise be too weak to detect.

The rounded lip in the preferred embodiment of the housing of the invention has a number of advantages over housings with thnadners. For one, for any particular overall maximum height of enclosure, thnadners limit the refraction of sound around the edge at the expense of a reduction in the effectiveness of the enclosure to interrupt direct passage of undesirable low-angle or near-horizontal sounds. The sharp triangular shapes of thnadners are prone to damage, they complicate the attachment of supplemental guy wires or other supports to the housing, and do nothing to contribute to the overall strength of the housing. Thnadners can snag blowing litter from natural or human sources, which if caught on the lip during windy periods can generate serious acoustical interference to system operation. Also, wind blowing past the tips of the thnadners themselves can be a source of interfering noise, while the more aerodynamic shape of a rounded lip allows air to pass over it without creating such noise. Also, the inventive housing with the rounded lip blends in more effectively with the environment, and will be less likely to attract eyesore nuisance complaints in some applications than a housing with thnadners.

It is possible by adjusting the phased array parameters to set the angle of emission of the side lobe low enough that a suitable enclosure can intercept it without interfering with the main beam. If the enclosure is lined with adequately sound-absorbing material, and the angle of the side lobe low enough, the beam may be further attenuated by repetitive reflection off the sound absorbent enclosure walls.

This invention features a housing for a phased array monostatic sodar system with a transducer array that sequentially emits and receives multiple generally conical main beams of sound along different primary axes, the housing comprising an enclosure that defines an interior volume that is essentially open to the atmosphere at the top, to emit and receive the beams, and a curved lip that at least in part defines the opening of the enclosure, the lip closely conforming to the conical shape of at least a portion of one main beam at the location of the lip.

The housing may further comprise a sound absorbent material covering at least a portion of the inside surfaces of the enclosure that face the interior volume. The enclosure may comprise one or more upwardly-directed sidewalls. The lip may be at the top of at least a portion of at least one sidewall. The top of the lip may be curved, to inhibit sound from being refracted as it leaves the housing. The curve of the top of the lip may be essentially partially circular. The sound emitted by the array may have a defined wavelength in air, and the radius of curvature of the lip curve is at least about as large as the wavelength of the emitted sound. The lip may be comprised of a plurality of partially elliptical lip segments.

At least some of the inside surfaces of the enclosure may be shaped to closely conform to at least one of the beams. At least some of the inside surfaces of the enclosure may be generally partially circular in cross section, to closely conform to a conical beam contour. The inside surfaces of the enclosure that are generally partially circular in cross section may be angled from the vertical, to define an inside surface that itself defines a portion of the surface of a generally vertical cone. The angle of the centerline of the beam cone may be about ten degrees relative to vertical, and more preferably may be about 11.2 degrees. The angle of the cone, and the angle of the inside surface of the enclosure may be angled at approximately five degrees to the centerline of the cone.

The array may produce three beams. The three beams may be oriented at about 120° angles to each other in azimuth. The transducers comprising the array may be mounted in a generally vertical plane, with the main beams reflected to and from the atmosphere by an angled sound-reflecting surface located within the housing. The housing may further comprise a drainage opening to allow detritus and precipitation to exit the enclosure. The housing may be molded from plastic material. The housing may be fabricated from rotationally molded polyethylene plastic. The lip may be comprised of a plurality of partially elliptical lip segments. The lip may be essentially horizontal.

The housing may further comprise a non-woven fiber sound absorbent material covering at least a portion of the inside surfaces of the enclosure that face the interior volume. The fiber may be synthetic. The sound-absorbing material may be made of polyester-based fibers. The fibers may be of a plurality of different diameters. The housing may further comprise an adhesive that bonds the sound-absorbing material to the enclosure surfaces. The adhesive may be a continuous film applied to the sound-absorbing material. The portions of the sidewalls that are contacted by a beam are preferably essentially entirely covered with the sound-absorbing material.

The array may comprise a plurality of individual sound transducers, for emitting sound into the atmosphere and for sensing emitted sound that has been reflected by the atmosphere, in which the transducers are arranged in a generally planar, generally hexagonal grid packing arrangement. The array may comprise a series of rows of tightly-packed essentially identical transducers, with the transducers in adjacent rows offset from one another, in a direction orthogonal to the row longitudinal axes, by about half (more specifically $\sqrt{3}/2$) the width of a transducer. The transducers may define a generally hexagonal perimeter shape. The transducers making up a row are preferably operated in unison at essentially the same frequency, and the operation of each sequential row is uniformly phase-shifted relative to the immediately proceeding row, to create beams that are tilted in altitude relative to the plane of the transducers. The row-to-row phase shift may be about sixty degrees. The beam angular width may be about five degrees from the beam main axis to the beam half power point. There may be at least three beams that are sequentially created, each such beam defining a main beam axis, wherein the three beam main axes are at essentially the same altitude of about 10 degrees from the normal to the plane of the transducers. The three beams may be oriented at about 120° angles to each other in azimuth.

In a more specific embodiment, the invention features a housing for a phased array monostatic sodar system with a transducer array that sequentially emits and receives at least three generally conical main beams of sound along different primary axes spaced from one another about 120 degrees in azimuth, the housing comprising at least three upwardly-directed sidewalls that define a volume between them that is essentially open to the atmosphere at the top, to emit and receive the beams, the sidewalls each defining an inside surface that itself defines a portion of the surface of a generally vertical or slightly angled cone, and a lip comprising at least three semi-elliptical upper lip segments, one at the top of each sidewall, such that the lip defines a multi-lobed curved perimeter at the top of the volume that closely conforms to the conical shape of a portion of each of the at least three main beams at the location of the lips. The sidewalls may be angled from the vertical at about ten degrees. The top of the lip may be curved, to inhibit sound from being refracted as it leaves the housing, the curve of the top of the lip being essentially partially circular, in which the sound emitted by the array has a defined wavelength in air, and the radius of curvature of the lip curve is at least about as large as the wavelength of the emitted sound.

Also featured is a method of designing a housing for a phased array monostatic sodar system with a transducer array that sequentially emits and receives at least three generally conical main beams of sound along different primary axes, comprising determining the approximate locations of the surfaces of the main beams, locating one or more upwardly-directed sidewalls that define a volume between them that is essentially open to the atmosphere at the top, to emit and receive the beams, and locating an upper lip at the top of at least a portion of one sidewall, the upper lip defining a curved perimeter at the top of at least some of the volume that closely conforms to the conical shape of the surface of at least a portion of three main beams at the location of the lip.

BRIEF DESCRIPTION OF THE DRAWINGS

Various other objects, features and advantages of the present invention will become fully appreciated as the invention becomes better understood when considered in conjunction with the accompanying drawings, in which like reference characters designate the same or similar parts throughout the several views, and wherein:

FIGS. 9A and 9B show the measured sound pressures over the array placed horizontally, operating with no enclosure. FIGS. 9C and 9D show the same measurements made over the same array installed in the preferred embodiment of the inventive enclosure as shown in FIGS. 6A-6E;

DETAILED DESCRIPTION OF PREFERRED EMBODIMENTS OF THE INVENTION

Figure 1:
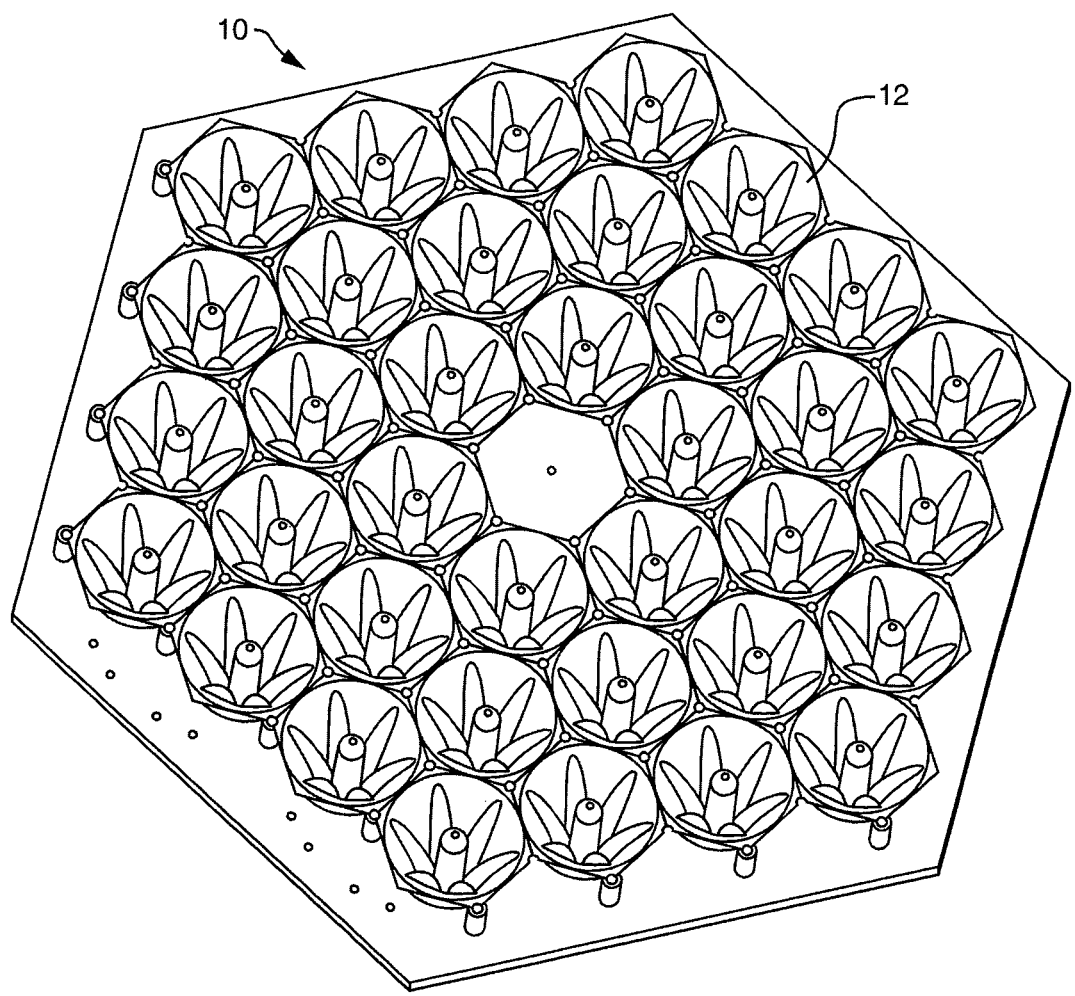
FIG. 1 is a perspective view of a thirty-six-transducer element array for use with an embodiment of the invention.

Monostatic sodars employ sequential, directed beams of sound as part of their operation. Individual acoustic transducers typically emanate sound in a wide wavefront approximating the surface of a sphere, rendering them unsuitable for sodar use without a focusing mechanism. Array 10 of closely packed and evenly-spaced transducers, FIG. 1, can accomplish focusing by producing a complex interfering pattern of wavefronts that effectively creates a principal beam that is narrower than that of an individual transducer. The angular spread of the beam is related to the number of transducers in the array: more transducers generally can create a narrower beam. Arrays of thirty-two to sixty transducers are usually adequate to produce beams that are narrow enough for sodar applications; array 10 has thirty-six transducers 12. Each transducer 12 has a circular actuator and horn. Transducers 12 are closely packed along a number of parallel rows (seven such rows in the non-limiting preferred embodiment of the invention shown in FIG. 1), with the transducers in adjacent rows offset from one another in a direction orthogonal to the rows by about one half (more specifically $\sqrt{3}/2$) of a transducer diameter. This arrangement is termed herein a generally hexagonal grid packing arrangement.

Each transducer is preferably of hexagonal overall perimeter shape, closely circumscribing a circular active horn region of about 3 inches in diameter. The transducer is based on a standard piezo-electric horn "tweeter" element modified in external shape to facilitate the generally hexagonal grid packing arrangement. The paper cone of the transducer can be replaced with a plastic cone (preferably polycarbonate or Mylar (which is a biaxially-oriented polyethylene terephthalate film) or equivalent, to improve the weather-resistance of the apparatus. Transducers 12 are provided with connectors for convenient installation and replacement in the apparatus. The transducer is designed to operate efficiently as both a transmitter and receiver of sound at the approximately 4000 Hz (more specifically 4425 Hz) operating frequency preferred for the apparatus. The size of the transducers is such that the phased array technique can create beams of sound with good directionality using a reasonable number of transducers. Other shapes and types of transducer elements are not as efficiently assembled into hexagonal arrays, do not operate efficiently as both transmitter and receiver at the desired operating frequency, and are not as suitable for installation in an apparatus operating in an exposed environment.

The generally hexagonal external shape of the array, and the generally hexagonal grid packing arrangement of the array, also permits the directional control necessary to steer beams without mechanical devices. Beam steering is accomplished by driving the transducers in a sequence of parallel rows, with the transducers within each row driven in phase with each other, and each of the rows driven at the same wavelength but with successive, equal phase shifts row-to-row. If there is no phase shift between rows, the principal beam is emitted along an axis that is orthogonal to the plane of the array. As phase shift is introduced, the interference pattern changes such that the beam is directed at altitudes that are no longer vertical (assuming the array is horizontal). Also, the beam is orthogonal to the axes along which the transducers making up each of the rows lie. Thus, by driving the transducers in rows of differing relative orientation, beams can be created that are directed along desired azimuthal directions.

Array 10 is comprised of a series of rows of closely-packed transducers. Each transducer has a generally hexagonal perimeter shape. This perimeter closely circumscribes the active transducer region, which is circular. The hexagonal perimeter primarily exists to facilitate assembling the array. There may be some additional advantage if the active transducer region itself were hexagonal, effectively eliminating all dead (i.e., non sound producing) area in the array. Similarly, a square transducer with a square active horn area, along with the transducers in adjacent rows offset by about one-half of the transducer width in accordance with the invention, could provide some (but not all) of the benefits of this invention as compared to the prior-art rectangularly arranged arrays. The array itself preferably has a generally hexagonal perimeter as shown in FIG. 1.

The generally hexagonal grid packing arrangement makes each active element of the array occupy a hexagonal area that is only about 10% greater than the actual area occupied by the circular shape of each transducer horn. Thus, only about 10% of the array area is not involved in sound production or sensing. This is contrasted with a prior art rectangular grid array element arrangement, in which each circular transducer occupies a square area that is about 27% greater than the actual area occupied by the circular transducer horn. The generally hexagonal grid packing arrangement of the array minimizes the area of the entire array that does not contribute to the desired interference pattern, nor to the uniformity of the sound pressure across the array. The air motion in the regions between the circular transducers can also create interference patterns that create sound emanations in other directions than the intended beams. The undesired emanations reduce the ability of the sodar system to resolve the directions of the beams, thus reducing its measurement performance. The undesired emanations can also radiate horizontally enough to strike trees and other adjacent objects, creating echoes of similar or greater magnitude than the reflections off the atmospheric phenomena from the intended beams.

Figure 2A:
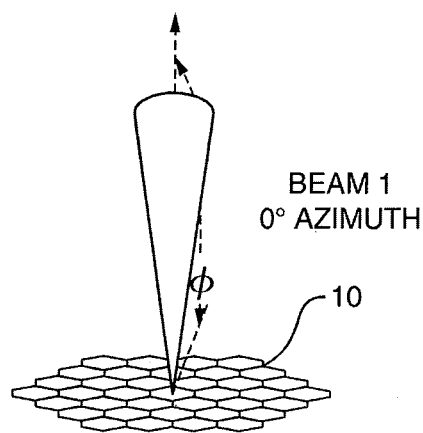
FIGS. 2A, 2B and 2C schematically depict three beams created by operation of the array of FIG. 1 in accordance with an embodiment of the invention. In these figures the beam is depicted at a much smaller scale than the array itself, for the sake of clarity.
Figure 2B:
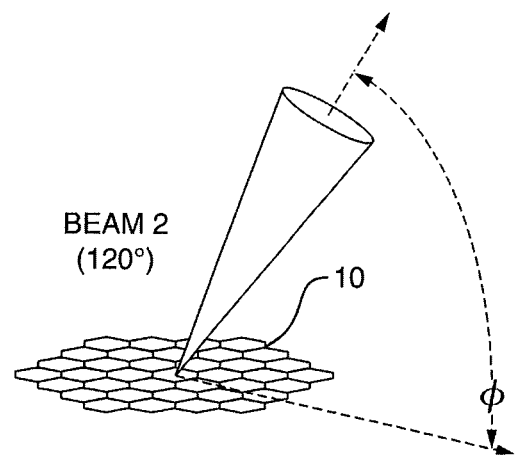
Figure 2C:
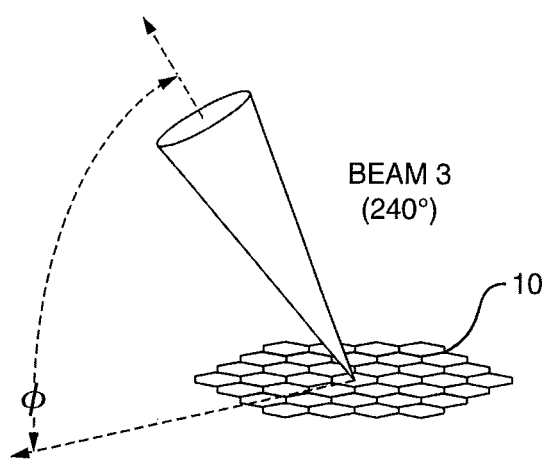
Figure 4A:
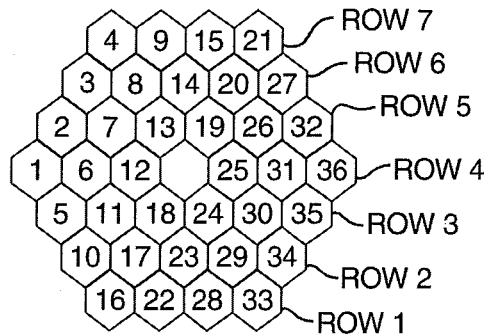
FIGS. 4A, 4B and 4C show the array element rows that are sequentially operated in order to produce the beams of FIGS. 2A, 2B and 2C, respectively.
Figure 4B:
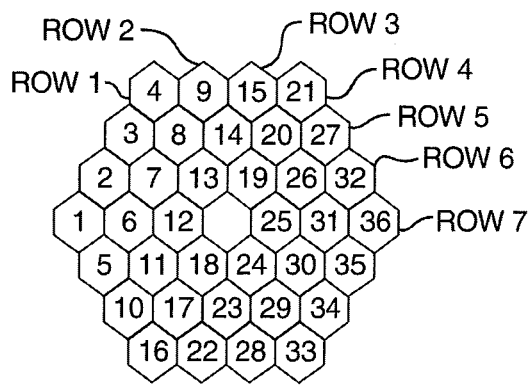
Figure 4C:
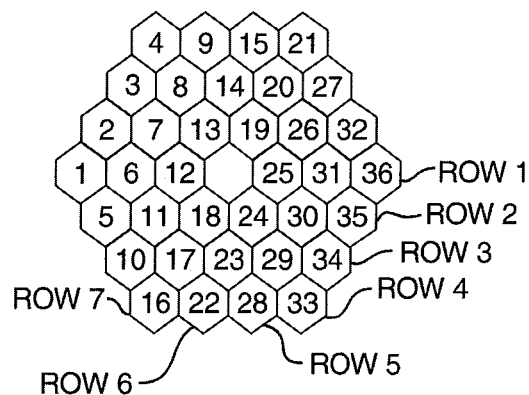

The generally hexagonal array of the invention is physically symmetric about six radial axes spaced sixty degrees apart. This can be accomplished with two or more transducers in each of the six outer rows making up the six sides of the hexagon; thus the minimum number of transducers is seven. Also, the transducers are closely packed in the array, with adjacent parallel rows of the array having their axes offset by $\sqrt{3}/2$ (approximately 0.866) times the transducer width. The generally hexagonal grid packing arrangement allows operation to sequentially produce from three to six generally conical beams that emanate along principal beam axes that are generally symmetrical around and lie on the surface of a virtual vertical cone having its apex located on an axis that is normal to the array. The preferred embodiment creates three such beams spaced 120° apart. The beams are at a favorable altitude that is determined by the manner of operation. Such beams are schematically depicted in FIGS. 2A-2C. This depiction is highly schematic, as the bottom of the beam is more like a circle roughly the size of the array. The effective length of the beam is about 400 times the diameter of the array. The operation of the array to produce such beams is schematically illustrated in FIGS. 4A-4C. A schematic block diagram of a system for accomplishing this operation is shown in FIG. 5.

For example, in order to produce beam 1 that is schematically shown in FIG. 2A, transducers 16, 22, 28 and 33 making up row 1 (see FIG. 4A) are driven with a particular waveform; transducers 10, 17, 23, 29 and 34 making up row 2 are driven by the same waveform with a phase shift of n; row 3 with a phase shift of 2n from row 1; row 4 shifted by 3n from row 1; row 5 by 4n; row 6 by 5n; and row 7 by 6n. Beam 2 is produced as shown in FIG. 4B by shifting the first row 120° in a clockwise fashion, such that the first row includes transducers 1, 2, 3 and 4, with rows 2-7 indicated in the drawing, and operating the array in the same fashion. Beam 3 is likewise produced as shown in FIG. 4C by again shifting the first row 120° in a clockwise fashion, such that the first row includes transducers 21, 27, 32 and 36 with rows 2-7 also indicated in the drawing and again operating the rows in the same fashion.

Figure 5:
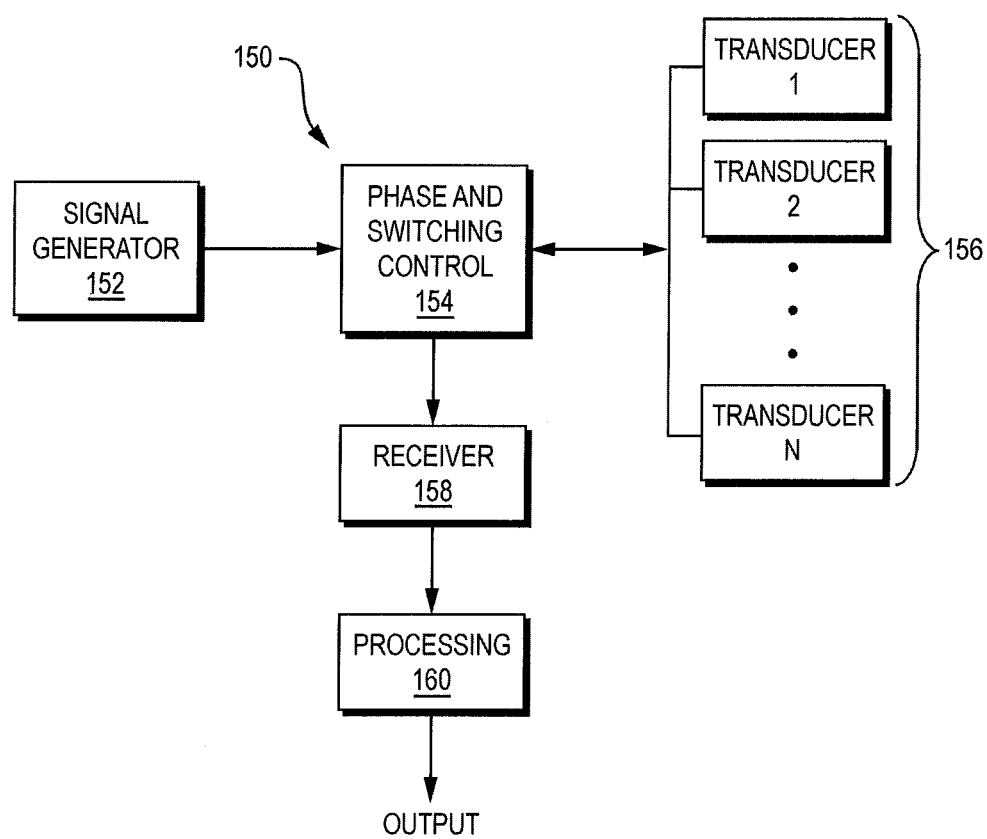
FIG. 5 is a schematic block diagram of a system for operating a transducer array in accordance with the invention.

System 150, FIG. 5, accomplishes this operation with signal generator 152 that supplies signals to phase control and switching control 154, which supplies the appropriate transducer drive signals to array 156 of transducers 1-N. The echo signals received by transducer array 156 are routed to receiver 158 and processor 160, which outputs atmospheric information that can be derived from a sodar system. The derivation of atmospheric information from sodar signals is known in the art, for example as set forth in U.S. Pat. No. 4,558,594.

System 150 can be accomplished as all hardware, or a combination of hardware and firmware, as would be apparent to one skilled in the art. Preferably, system 150 is accomplished with hardware, except that all of signal generator 152, portions of phase and switching control 154, and all of processing 160 are implemented as firmware within microprocessors and a DSP chip.

As the transducer arrangement of array 10 is symmetric with respect to each of the six sides of the hexagonal array, the three beams are essentially identical to one another, the only difference being the azimuthal direction of the beams' main axes. Up to six such beams could be created.

Horn-shaped enclosure 100, FIGS. 6A-6E, is similarly symmetrically shaped, defining three identically-shaped lobes 102, 104 and 106 spaced 120° apart about central vertical axis 105 of enclosure 100. In enclosure 100, array 10 is preferably positioned vertically, behind access door 122 and directly facing flat sound-reflecting surface 110 that is 45° from vertical so that it acts as a sound mirror. See the cross-sectional view of FIG. 6D. This arrangement acoustically approximates the same array 10 being positioned horizontally at the center bottom of the enclosure, as shown in the top view of an alternative embodiment, FIG. 10. The vertical array position shown in FIG. 6D inhibits the transducers from collecting water, ice, snow, or debris.

In one non-limiting embodiment, each transducer is about three inches in diameter, and the array is operated at frequencies corresponding to wavelengths of approximately 3 inches. A typical frequency may be 4425 Hz. Sounds near this wavelength have been found to both reflect from and travel through turbulence and thermal gradations in the atmosphere, a compromise that is essential to sodar operation. With the preferred array made up of thirty six transducers in seven rows, the phase shift from row to row is about 60 degrees, (or, about $3.75 \times 10^{-5}$ sec) which accomplishes an essentially vertical beam, tilted slightly from the vertical at about ten degrees (more specifically at 11.2 degrees) in altitude from the normal to the plane of the transducers, and with a main beam angular width of about five degrees measured from the main beam axis to the half power point. The beam power drops to about zero at a null that is located at about ten degrees from the beam main axis (a total beam width of about twenty degrees). Preferably, each of the three lobes, 102, 104 and 106 of housing 100 defines an inner surface that lies at about the location of this null for beams 1, 2 and 3 respectively. In cases in which the enclosure is lined with sound-absorbing material, this inner surface is defined as the inner surface of the sound-absorbing material. This allows the full main beam to be utilized in atmospheric sensing while helping to intercept and thus squelch both unwanted emanations that are not part of the main beam, and unwanted return signals that are not reflections of the main beam. Alternatively, the inner surface of the enclosure can lie closer to the main axes of the beams, which will create narrower, less powerful beams.

The preferred embodiment of the array as shown in FIG. 1 has thirty-six transducers; there is no transducer at the center of the array, although there could be. This is primarily due to the electronics in the preferred embodiment, which were designed around integrated circuits that are generally used for surround sound applications. These circuits each have 3 left and 3 right channels—for a total of six each. So each sixty-degree segment of the array can be neatly handled by one of these circuits, for a total of six geometrically and electronically identical subdivisions of the transmitting circuit. Adding the 37th transducer to the center of the array thus adds substantial complexity to the transmitting circuit design, as well as to the firmware. Testing indicated that the center speaker doesn't have a substantial impact on the directionality of the unit—at best it might increase directionality by 3%, while it increases cost and complexity of the electronic equipment by perhaps as much as 17%. Accordingly, leaving the center speaker out is an appropriate trade-off between cost and functionality.

Figure 6A:
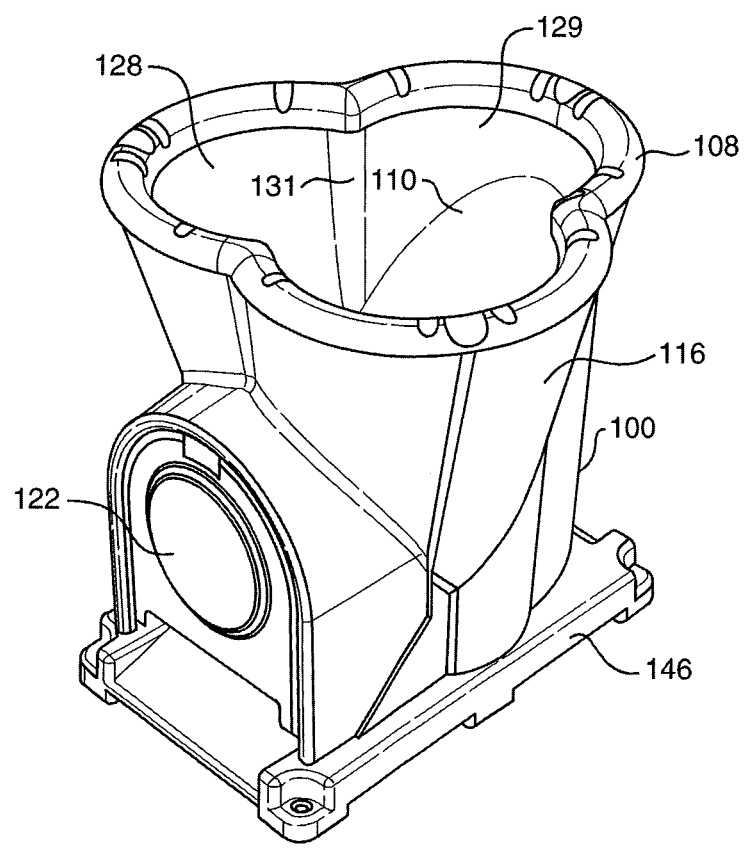
FIGS. 6A and 6B are different perspective views.
Figure 6B:
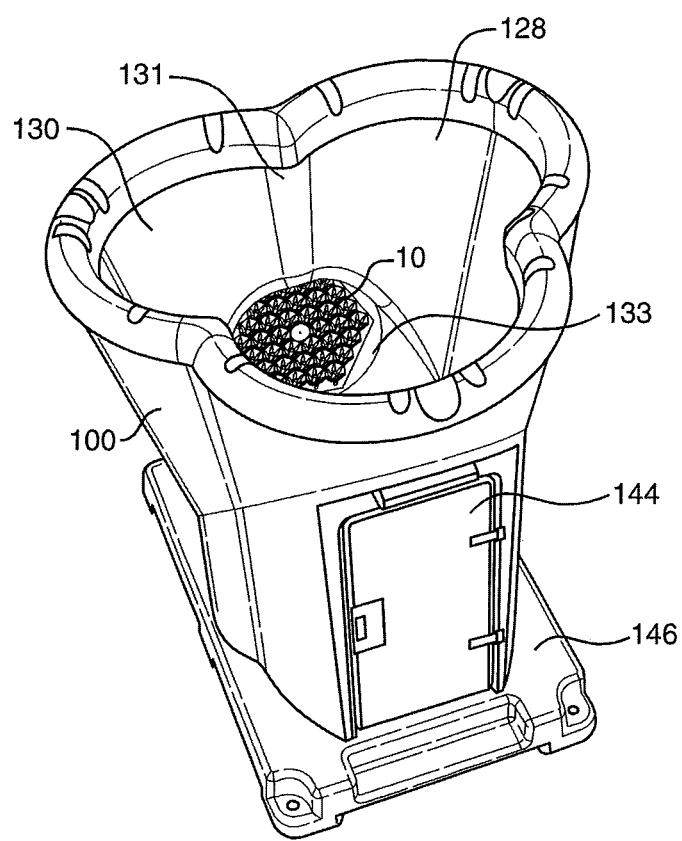
Figure 6C:
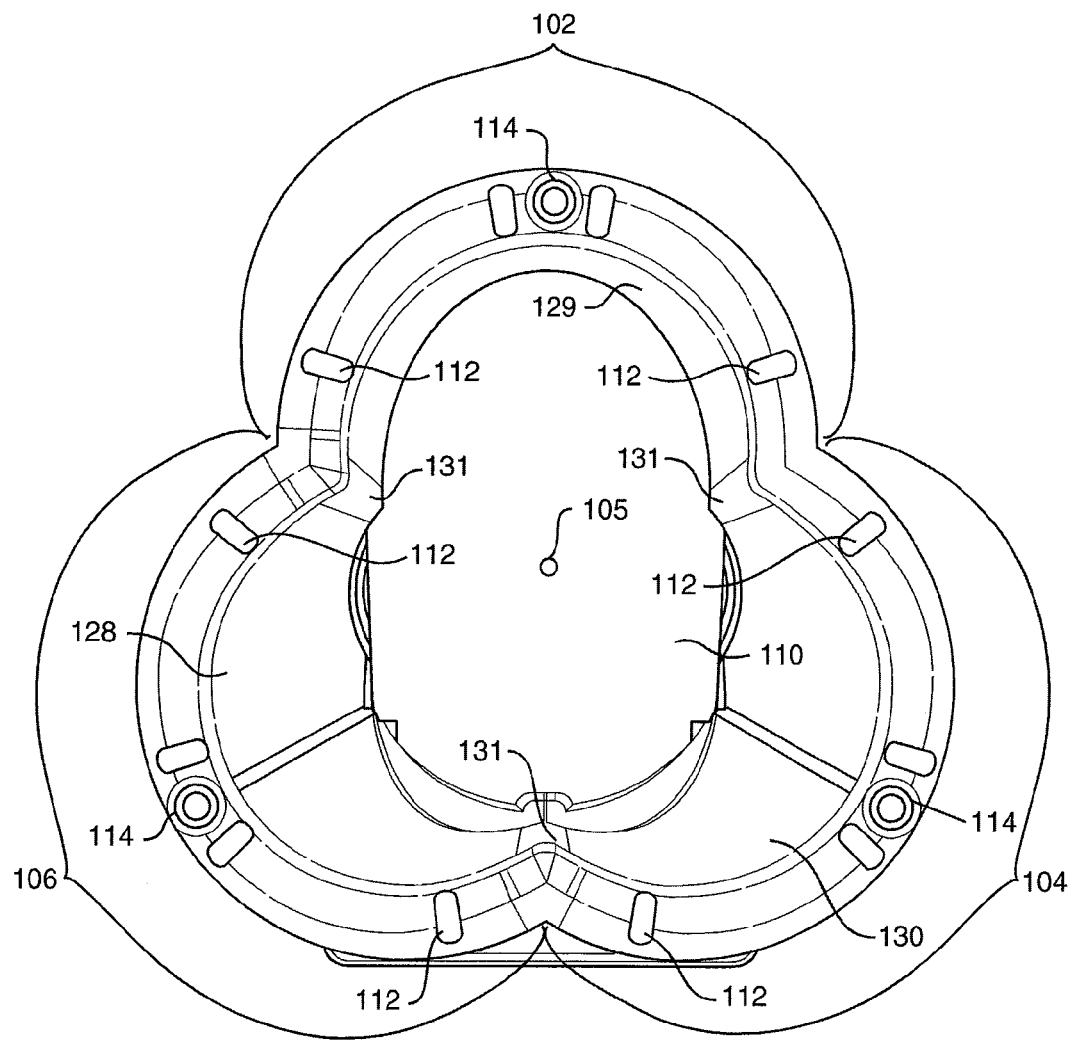
FIG. 6C is a top view, of the preferred embodiment of the sodar enclosure of the invention.
Figure 6D:
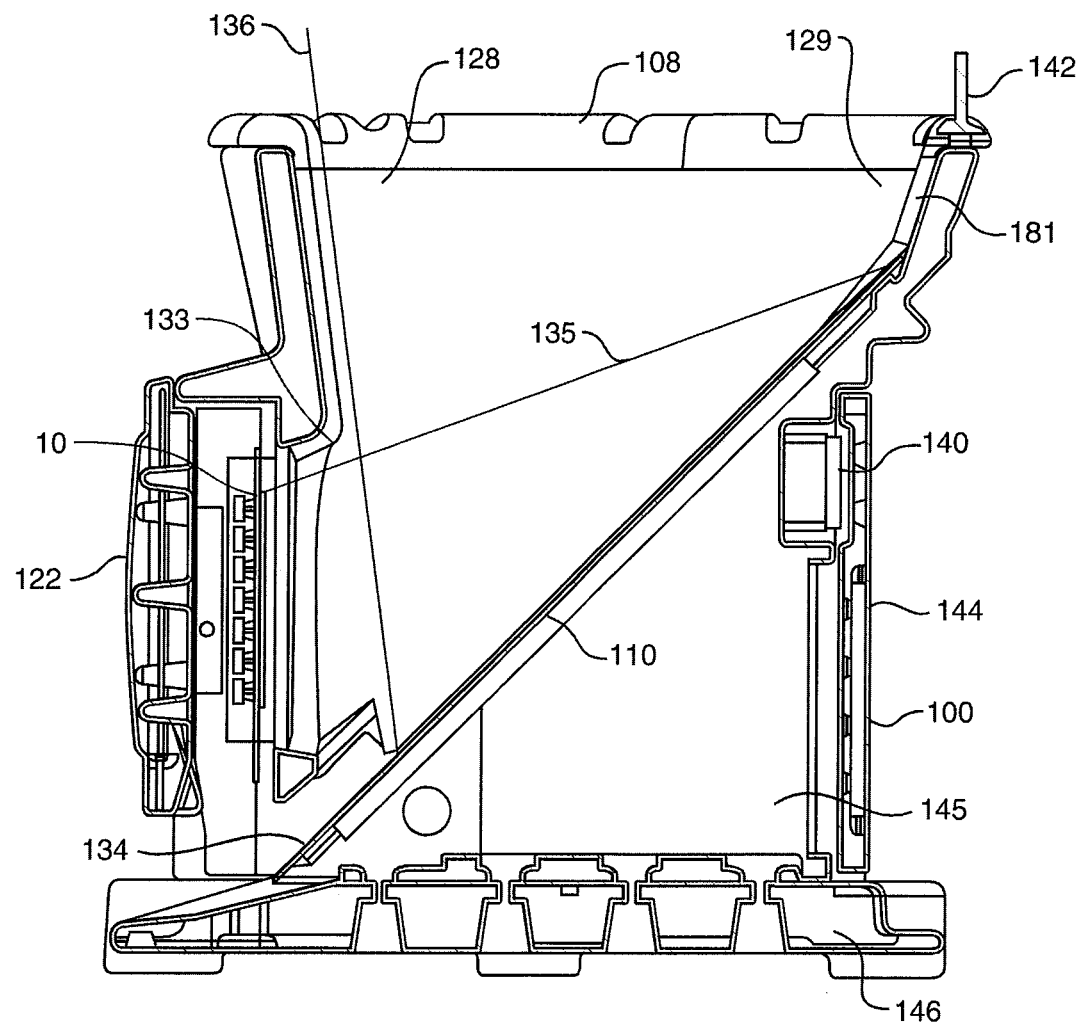
FIG. 6D is a cross-sectional view of the enclosure shown in FIGS. 6A-6C, detailing the sound beam path.

The preferred embodiment of the enclosure of the invention is comprised of a structure 100, FIGS. 6A-6E, shaped to partially envelop with some accuracy the multiple desired beams and corresponding cones of sensitivity of the sodar. Interior sidewalls 128, 129 and 130 are partially conical, each circumscribing approximately half of a main beam, and located at the first null, as described below. These walls are preferably lined with a sound absorbing material. For example, as shown in FIG. 6D, the interior of sidewalls 128 and 129 shown in the drawing are lined with one or more layers of sound absorbing material 181. The generally conical wall 133 that is very close to array 10 is also lined with material 181.

The preferred lining is a single layer of 1½" thick white felt, which is a non-woven material made from polyester fibers of varying diameters and provided by National Non-Woven Fiber Inc. of Easthampton, Mass., or an equivalent such as more than one layer of this material, a different total thickness of this material, or a different non-woven material such as a natural-fiber felt. The preferred felt-like material can be made of various types of synthetic fibers, such as polyester, polyethylene, polypropylene, or nylon. The fibers are of various deniers, typically ranging between 0.8 and 100 denier. The material is a carded web that is cross-laid and needle punched. The material can be stiffened as desired by heat setting or additive treatment. The thickness is about 1.6". The weight is about 72 ounces per square yard. The material comprises about 80% void volume. The differing fiber sizes and large amount of void space provide excellent sound damping in the frequency range of interest of around 4000 Hz. The material is preferably adhered to essentially all of the inside faces of the housing that are exposed to a sound beam using an appropriate pressure-sensitive adhesive film that is applied to one face of the felt material. Test results of this preferred lining material are set forth below. Enclosure 100 is designed such that the surface of the absorbing felt material is coincident with the predicted and experimentally verified first major "null" position of the beam/cone. See FIG. 8 and its description, below. The thickness of the felt is preferably at least about as large as one-half of the wavelength of the sound emitted by the array; this thickness ensures that any sound that reflects off of the underlying enclosure walls must travel through a thickness at least about equal to the wavelength, which increases sound damping. The use of felt to damp sound accomplishes at least the following advantages.

Upper lip 108 of housing 100 is preferably rounded with a large radius, preferably equal to or larger than the wavelength of the transmitted sound. Three identical semi-elliptical upper lip segments tie the structure together by being bolted to threaded inserts in the enclosure body 116 at six positions 112, and to pairs of threaded inserts at three positions 114. The lip sections essentially lie along the intersection of a horizontal plane and each of the three angled cones that are defined by the first nulls of the three sound beams. Enclosure lifting and/or anchoring eyebolts can be threaded into inserts at locations 114. Alternatively, a satellite or cellular antenna 142 can be mounted at one location 114.

Since the beams of a single-array sodar emanate from the surface of a single phased array 10, but in different directions, their conic profiles overlap spatially near the array. This means that the enveloping structure has an unusual "fluted" shape as shown in the drawings. If the shape were extended vertically, it would become a three-horned enclosure joined at the base. Since the height of such a structure would be impractical, the fluted shape is best for the desired portability of the sodar system. The enclosure wall making up each of the three flutes generally defines a semi-circle in cross section; since the cones are tilted from the vertical, the horizontal cross section is elliptical. The cones all emanate from array 10, taking into account 45° reflector 110. In the preferred embodiment, the structure has an overall height, from bottom of the mounting base 146 of approximately 74 inches. The width measured to outside of lip 108 at the widest point between any two flutes is approximately 70 inches.

Figure 6E:
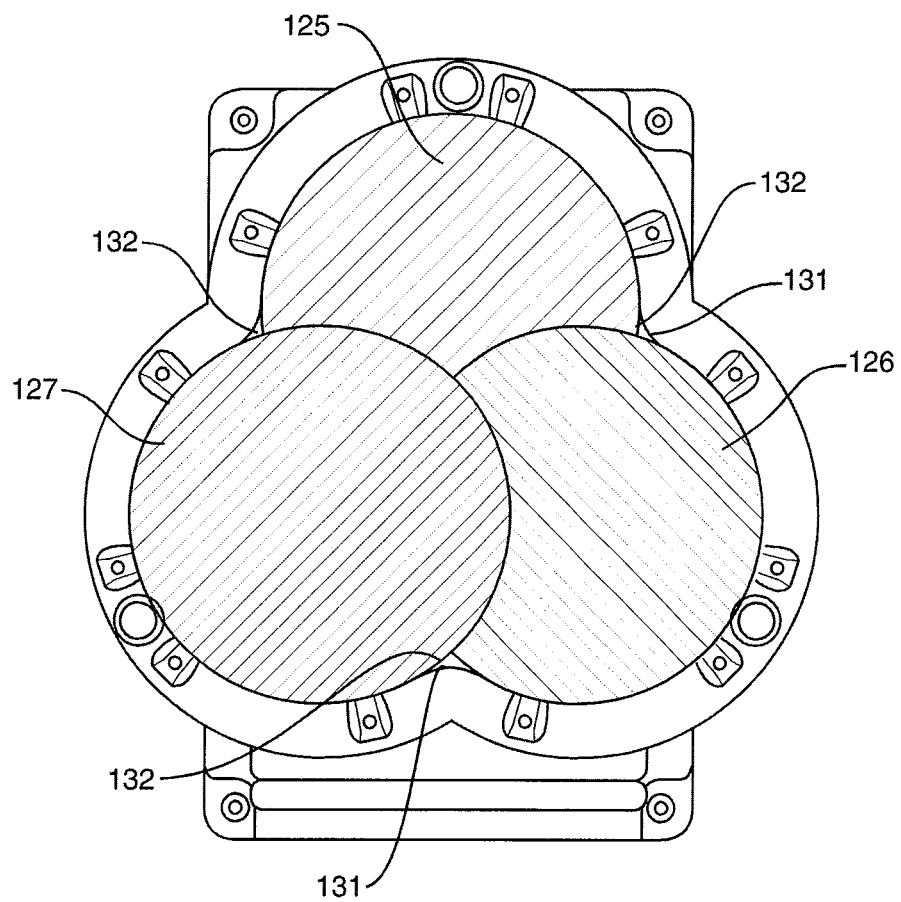
FIG. 6E is a view similar to that of FIG. 6C schematically depicting the three sound beams.

FIG. 6E shows the top of the structure. Overlapping areas 125, 126 and 127 show the approximate cross sections of the beams where they exit the opening in the top of the structure. Areas 125, 126 and 127 indicate the cross sections for beams 1, 2 and 3 respectively. As is apparent from the illustrations, these sections substantially overlap in the central area of the structure, but each beam has a non-overlapping area which forms the fluted shape of the structure. The central cavity of the structure is substantially the union of three overlapping conic sections, 128, 129 and 130 shown in FIG. 6C for beams 1, 2, and 3 respectively to allow the three conical beams to pass unimpeded from the structure. Radiused surfaces or fillets 131 are provided so as to allow conic sections 128, 129, and 130 to join without a sharp corner. Such a sharp corner would be undesirable due to manufacturing and structural considerations, and might introduce undesirable diffraction of off-axis sound which would otherwise be properly intercepted by the structure. In FIG. 6E areas 132 which result from these radii, constitute the areas of the opening of the structure which are not needed by any of the three beams.

Since these areas 132 are quite small, the harm caused by their presence is small compared to the benefits of the radii 131 discussed above.

Figure 3C:
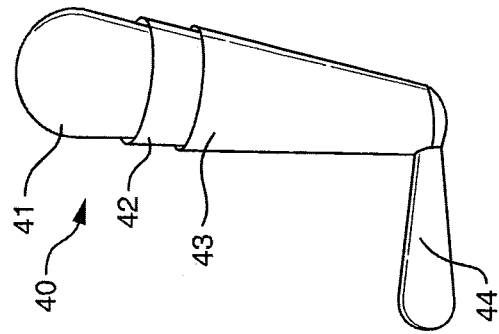
FIGS. 3A-3C schematically depict simplified versions of the three beams emanating from a horizontal phased array without the enclosure of the invention, each beam surrounded by its two closest annular "wake" rings, and each beam with its principal side lobe.
Figure 3B:
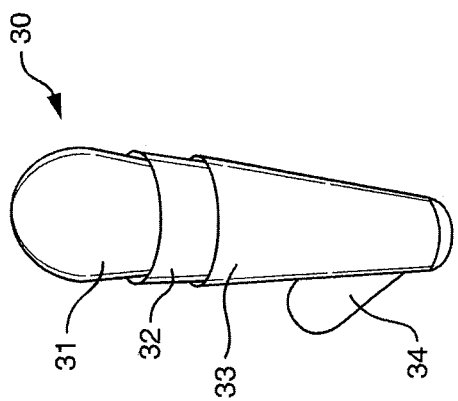
Figure 3A:
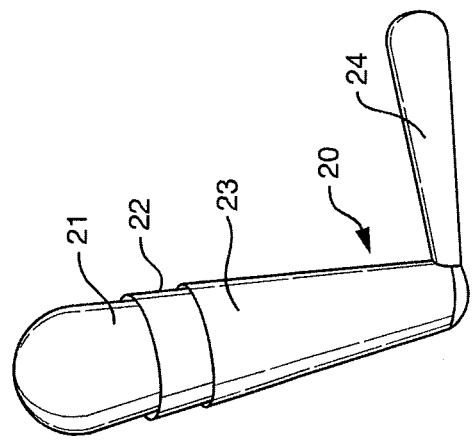
Figure 7C:
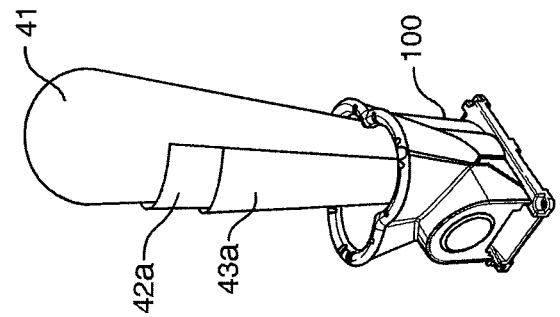
FIGS. 7A-7C depicts three equivalent beams to those of FIGS. 3A-3C, respectively, emanating from a phased array with the preferred embodiment of the enclosure of the invention, showing that the side lobes of each beam and the majority of the annular rings have been eliminated by the enclosure, leaving only artifacts of the annular rings.
Figure 7B:
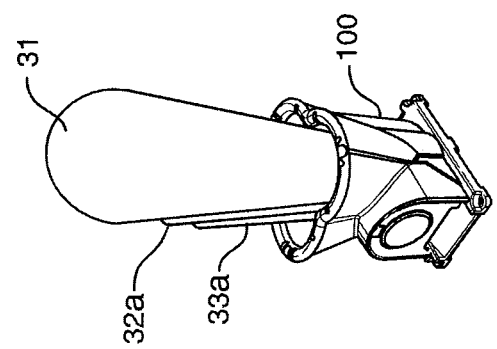
Figure 7A:
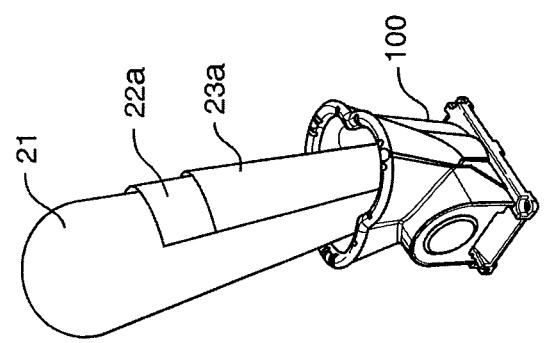

The enclosure's effectiveness is limited by the openings created by the intersections of the cones that form its shape. In the case of any particular beam, the housing fails to intercept the off-axis signals for that beam that happen to fall within the main directions of the two other beams (for example, the portions of areas 126 and 127 which do not overlap area 125 fail to intercept some of the off axis sounds of beam 1, and similarly for beams 2 and 3). Such off-axis signals are predominately remnants of the generally annular rings surrounding the main beam. The first two of these rings are shown in FIGS. 3A-3C. The ring fragments remaining after the enclosure wall intercepts a portion (about half) of each ring are shown in FIGS. 7A-7C.

Two O'clock beam 20, FIG. 3A comprises main beam 21, and undesirable portions comprising side lobe 24, and first and second annular rings 22 and 23, respectively. When enclosure 100 is used, beam 20 is partially circumscribed such that side lobe 24 is squelched, as are the outer portions (about half) of annular rings 22 and 23, leaving ring fragments 22a and 23a, FIG. 7A. Ten O'clock beam 30, FIG. 3B comprises main beam 31, and undesirable portions comprising side lobe 34, and first and second annular rings 32 and 33, respectively. When enclosure 100 is used, beam 30 is circumscribed such that side lobe 34 is squelched, as are the outer portions (about half) of annular rings 32 and 33, leaving ring fragments 32a and 33a, FIG. 7B. Six O'clock beam 40, FIG. 3C comprises main beam 41, and undesirable portions comprising side lobe 44, and first and second annular rings 42 and 43, respectively. When enclosure 100 is used, beam 40 is circumscribed such that side lobe 44 is squelched, as are the outer portions (about half) of annular rings 42 and 43, leaving ring fragments 42a and 43a, FIG. 7C.

The remaining ring fragments are of a relatively well-defined intensity and direction, and come from a near vertical direction where any response is almost certainly from clear air, which will return a comparatively weak signal, and not from trees, buildings or other potentially interfering structures which would return a strong, and potentially disruptive, signal. Also, they are fairly close to the desired main beam and essentially symmetrical between the various beams. Because of these factors, it is possible to estimate the contribution of the annular ring fragments to the overall main beam and mathematically correct for any error in estimation of wind speed or other atmospheric properties which these they might otherwise introduce. The annular ring fragments for each beam combine with that main central beam in a way that simply biases the effective beam to be slightly more vertical that would be expected from the main central beam alone. Such a bias can be accounted for in the calculation of the horizontal wind speed.

In the preferred embodiment, the housing is assembled from a small number of thermoplastic (polyethylene) parts custom molded (e.g. by rotational molding) to shape for the application. However, since large portions of the housing consist of partially conic sections, in an alternative embodiment the majority of the housing could also be fabricated by forming flat stock such as suitably damped sheet metal, sheet plastic, composite material sheet or plywood into developable conic sections. Further alternative embodiments are possible in which the housing is fabricated from a large number of flat surface components to approximate the shape of the desired cavity shape, or from foam or other bulk solid materials cut to the desired shape.

Theoretical prediction and analytic testing show that the geometry of the lip, or upper edge of the housing structure, should not be a sharp edge. Theory suggests that forming a rounded lip at the upper edge of the structure, where the radius of curvature of the lip is large, for example greater than or equal to the wavelength of the transmitted sound, substantially eliminates any problems with refracted or reflected sound. Experimental measurement confirms this. The lip can be integral with the sidewalls (i.e., the top of the sidewalls) or can be a separate structure, as shown in the drawings.

Figure 10:
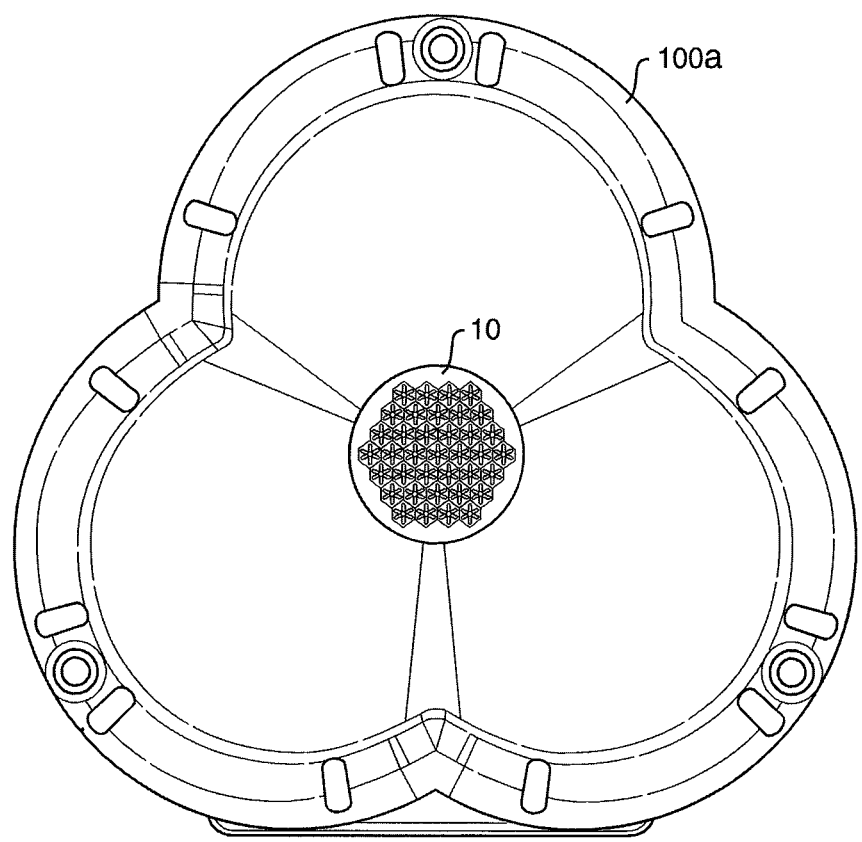
FIG. 10 is a top view of an alternative placement of the transducer array in an enclosure of the same general design as that shown in FIGS. 6A-6E.

In the preferred embodiment, the phased array of the sodar is mounted vertically for protection from precipitation, and a diagonally oriented aluminum plate serves as a reflector, or "mirror," to orient the beams into the desired near-vertical directions. In the preferred embodiment, this mirror is suspended by the housing and structurally reinforces it. However, other embodiments are possible where the reflecting surface is of other materials, where the reflecting surface is mounted independently of the housing, where the reflecting surface does not reinforce the housing, or even (with loss of some, but not all, benefits of the invention) where the reflecting surface is omitted, and a phased array directly facing upwards is surrounded by a somewhat simpler housing. Horizontal mounting of array 10 in enclosure 100a is shown in FIG. 10.

In the preferred embodiment, the housing envelops accurately the shape of the conic beams as they travel approximately horizontally from the phased array to the mirror, and also envelops the beam shape as it reflects off the mirror and out the top of the housing. Surface 133, shown in FIG. 6D surrounds the three conical sound beams immediately following their emission from array 10. This surface encloses the union of the volume taken up by the three beams. The shape of surface 133 is essentially a conical section. More specifically, preferably its shape is an extension of the three-lobed fluted shape of the interior of the enclosure, reflected off of the sound mirror at the location of surface 133. Immediately after exiting array 10, the beams overlap substantially enough that the difference in shape between three overlapping cones and a single essentially conical shape is not very pronounced, and surface 133 could, in fact, be formed as a simple conical section surface with little difference in performance. Although the extent of surface 133 is not large, its proximity to array 10 is such that it is of more significant importance in intercepting side lobes 24, 44 and (especially) 34 than its size would suggest.

Other embodiments are possible where the shape of the housing does not continuously follow the shape of the beams. In an extreme case, the housing could have an arbitrary, for example rectilinear, shape with only the opening at the top contoured to the cross-section of the beams as they exit the housing, for example through use of the same lip as in the preferred embodiment. To perform as well as the preferred embodiment, such a rectilinear housing would require superior sound absorbent material to damp internal beam reflections.

In the preferred embodiment, the housing is equipped with an opening, or scupper (134 in FIG. 6D) at the lower end of the reflector, below the vertically mounted phased array, sized to provide a passage for rainwater, leaves and other detritus to exit the housing. Further, for cold climate installations, the reflector may be optionally equipped with a heating system (not shown) to melt any snow or ice that might accumulate, and allow this precipitation to also exit the scupper in liquid form. This can be accomplished electrically, or by including a propane tank as a fuel source for the heating system in area 145 behind door 144. Other embodiments are possible, for example without any provision for allowing the exit of detritus where such is unlikely to accumulate, or by provision of a suitable screen that is sufficiently transparent to sound over the opening of the housing to inhibit detritus from entering the housing in the first place.

In the preferred embodiment, the housing is employed with a hexagonal phased array that transmits three beams angled off vertical spaced at 120° angles from each other in azimuth. However, other embodiments are possible where the housing is fitted to other phased array architectures, including a more conventional rectangular grid packing arrangement phased array transmitting one directly vertical beam and two angled beams oriented at a 90° angle to each other in azimuth, as detailed in U.S. Pat. No. 4,558,594. In this latter case, the overall performance of the system will be inferior to the preferred embodiment with three or more symmetric beams. However, the inventive housing, with a lip that defines two or more generally partially elliptical lip segments, and preferably with walls that are located at the first null of each of the three beams, will be of considerably greater value due to the significantly poorer directional performance of the prior art rectangular grid array relative to the hexagonal grid array of the preferred embodiment.

In the preferred embodiment the hexagonal phased array is mounted such that one of the three beams leaves the reflector angled in an azimuth direction opposite the array, and the other two beams are oriented in azimuth reflecting generally back over the array at 60° angles resulting in a most compact overall size. Where size is a less significant concern, other embodiments are possible.

Figure 8:
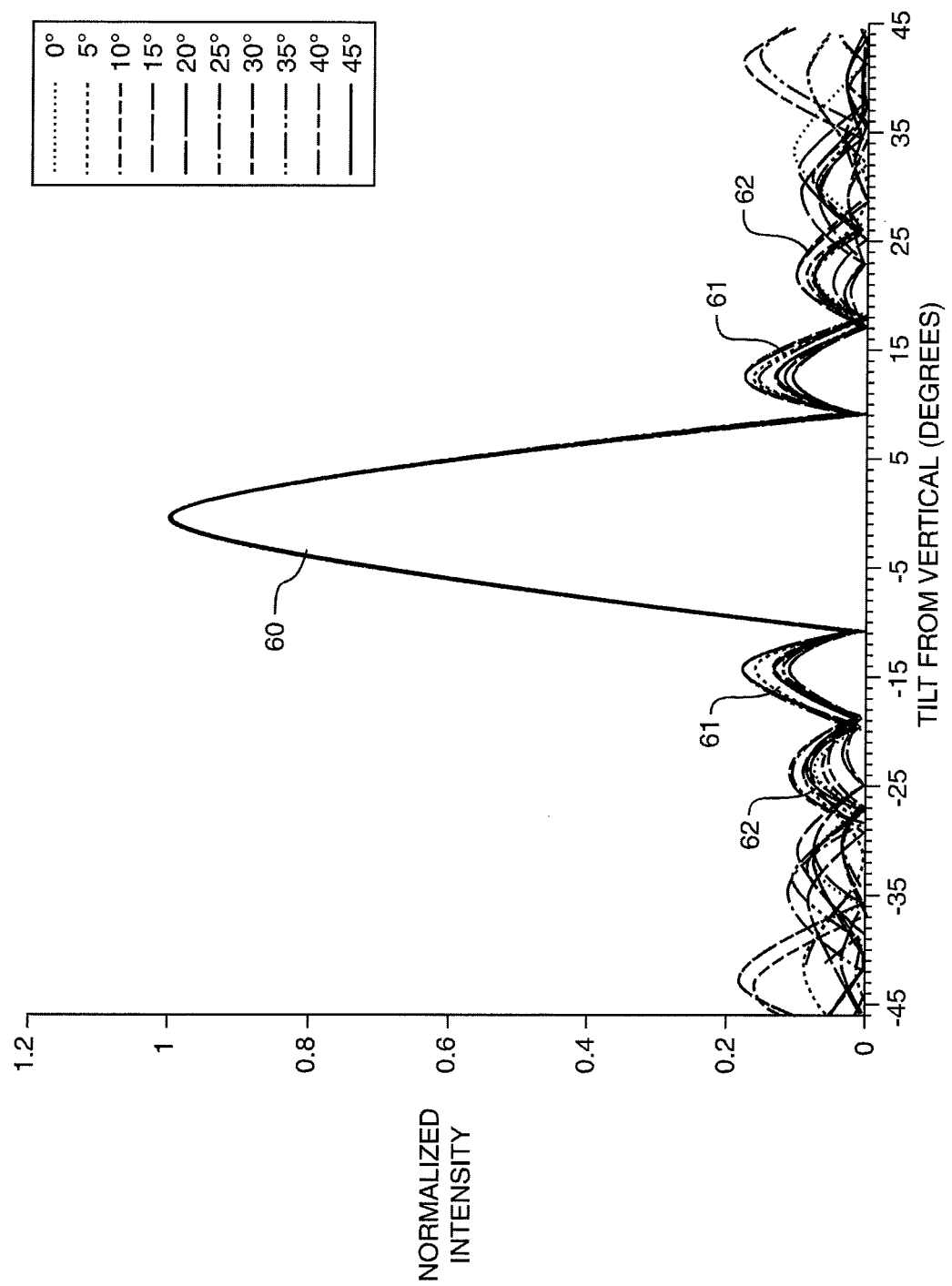
FIG. 8 is a composite of plotted normalized magnitudes of computer-modeled emissions from a prior art rectangular grid transducer packing arrangement 32-element phased array, wherein the emitter elements are modeled as point sources and all elements are in phase with each other, such as to produce a main beam perpendicular to the plane of the array.

FIG. 8 is a composite of plotted normalized magnitudes of computer-modeled emissions from a prior art 32-element rectangular grid packing arrangement phased array, wherein the emitter elements are modeled as point sources and all elements are in phase with each other, such as to produce a main beam perpendicular to the plane of the array. The magnitudes are plotted against tilt angle from vertical, which is the center of the beam. The different plots each represent a predicted beam intensity as a function of tilt angle, as measured along different angles from the array rows, 0 (or 90) degrees being in line with the rows, 45 degrees being diagonal to them. In all of these cases, the model predicts the main beam 60 dropping off abruptly to a first null at about 10 degrees of tilt angle. The intensity increases again at a greater angle to produce first annular ring 61, then second annular ring 62, and so on, as shown in the figure. The inside surfaces of the inventive enclosure are preferably positioned immediately outside of the first null position at about ten degrees from the main beam axis, to block the formation and emission of all but the desired main beam.

Figure 9A:
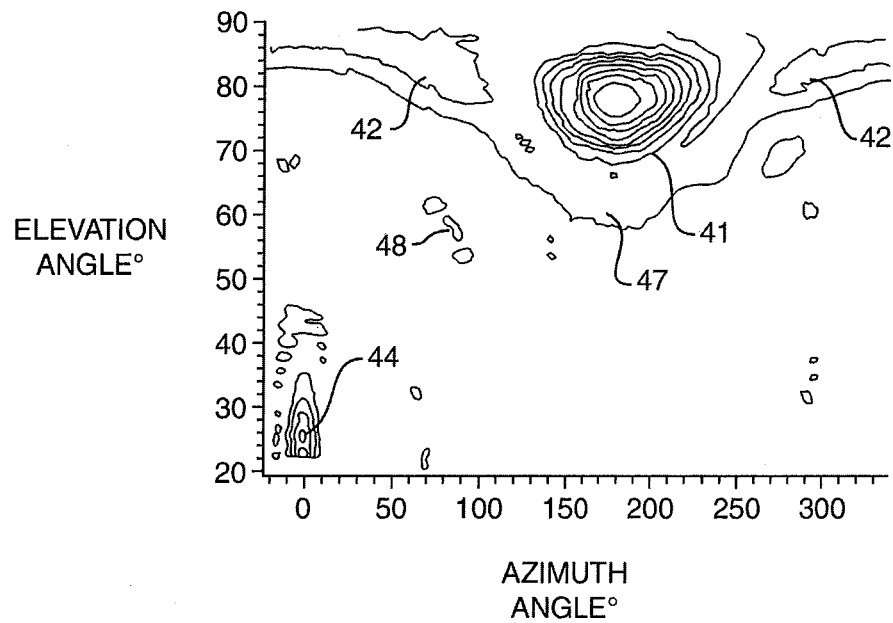
FIGS. 9A-9D are graphical "mosaic" summaries of sound intensity measurements taken over an approximately hemispherical matrix of positions over a prototype of the preferred embodiment of a thirty-six element hexagonal grid packing arrangement array which was programmed to emit the beams shown in FIGS. 3A-3C.
Figure 9B:
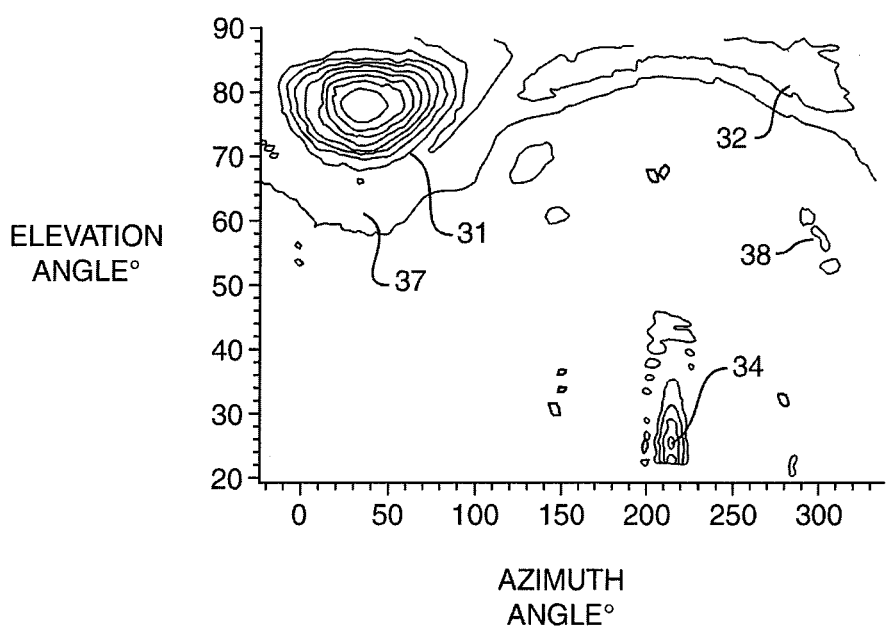
Figure 9C:
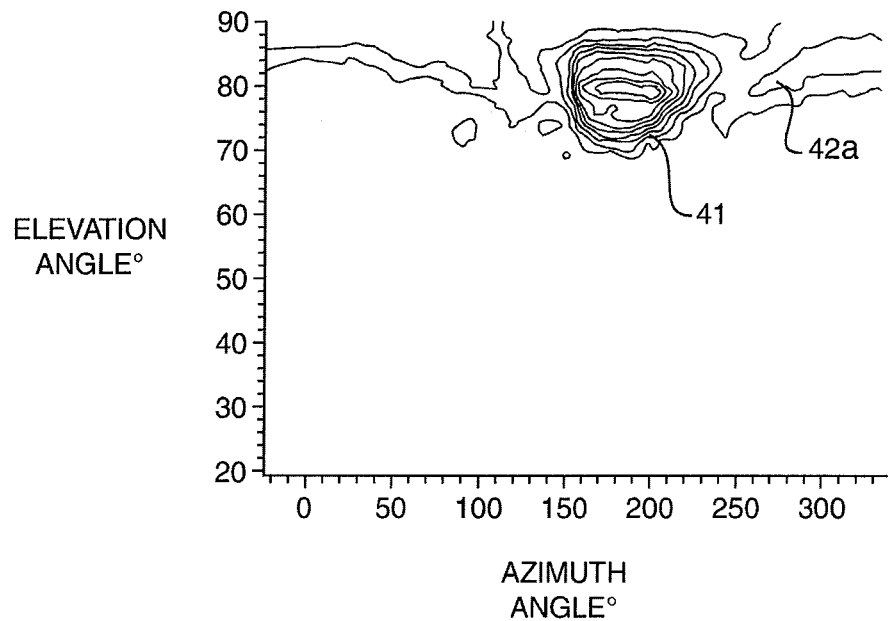
Figure 9D:
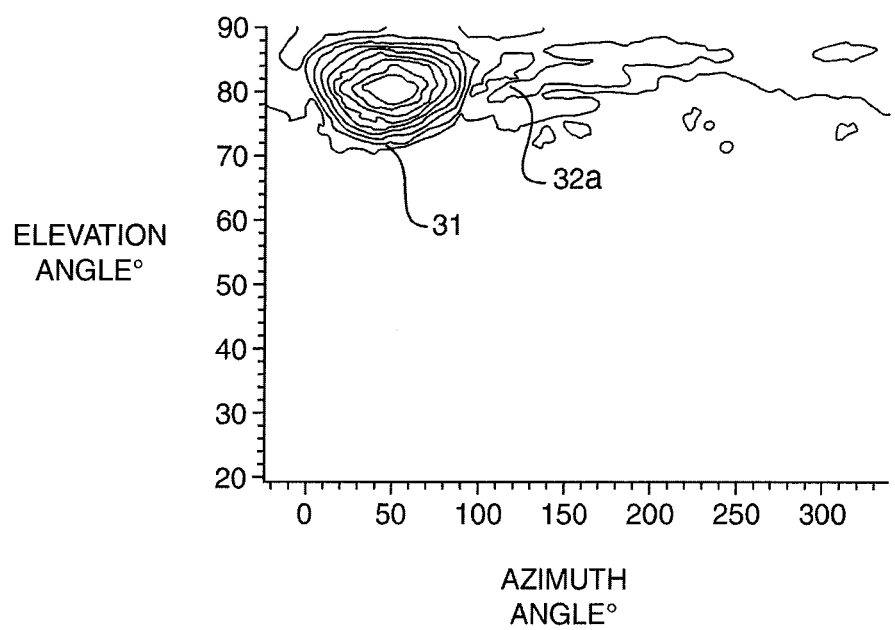

FIGS. 9A and 9B show results of testing a bare hexagonal phased array transducer of the preferred embodiment herein. FIGS. 9C and 9D show results from testing the same transducer array mounted within the preferred embodiment of the inventive housing shown in the drawings. The prototype used in this series of experiments was manufactured from plywood and sculpted foam, but otherwise matched the design of the molded plastic preferred embodiment housing described above.

The system was tested in transmitter mode, emitting pulsed sound signals at 4425 Hz, a typical operating frequency for sodar systems. A computerized instrumentation system consisting of a scanning array of microphones was used to map the emission patterns of the bare phased transducer array (FIGS. 9A and 9B) and the emission pattern from the array mounted within the housing (FIGS. 9C and 9D).

For each run the data was normalized to a signal strength of 1.00 at the center of the main beam 41 in FIGS. 9A and 9C, and 31 in FIGS. 9B and 9D. Coordinate transforms were carried out to map the data into a spherical coordinate system centered in the instrument's frame of reference, and contours of equal sound intensity ("i" in the figure) were plotted.

Data was collected for the case in which the beam emanates from the instrument in the azimuth direction opposite the position of the array (referred to as the "6 O'clock beam") and also for the case in which the beam emanates in the direction 120° counter-clockwise viewed from above from the first case (referred to as the "2 O'clock beam"). These data are shown in FIGS. 9A and 9C, and 9B and 9D, respectively. No data was taken for the third ("10 O'clock") azimuth direction. Due to the bilateral symmetry of the enclosure, the "2 O'clock" and "10 O'clock" beams will be mirror images, otherwise identical to the limits of experimental accuracy.

Inspection of FIG. 9A shows that the bare array produces a side lobe 44 (at 0 degrees) greater than 0.4 times the intensity of the main beam; this side lobe is shown in FIG. 3C. This harmful beam is eliminated entirely by the housing (see FIG. 9C), as it is at a very low altitude of around 25 degrees and so strikes the housing walls and is absorbed by the sound-absorbent wall lining. Also, in the bare array data, the annular ring predicted by theory is apparent as a region 42 of signal intensity approaching 0.3 times the intensity of the main beam within an area 47 approaching 0.2 times the intensity of the main beam. Due to the plotting projection and experimental data variability, the ring shape is considerably distorted. As expected, portions of this ring remain in the housing data (42a FIG. 9C), but area 47 of the annular ring is greatly attenuated in size and intensity as is the overall intensity of the ring relative to the bare array data. Similarly FIG. 9B shows side lobe 34 and a significant annular ring 32, 37 for the bare array 2 O'clock case. Side lobe 34 and the major area 37 approaching 0.2 times main beam strength in the bare array case, FIG. 9A are virtually eliminated in the housing case, FIG. 9D. The area of the annulus approaching 0.3 times main beam strength, 32, FIG. 9B, is greatly reduced in the housing data (area 32a shown in FIG. 9D) relative to the bare array data of 9B. In the bare array data of FIGS. 9A and 9B, a number other minor regions of undesirable off-axis sound are apparent, e.g., regions 48 and 38. These areas are virtually absent when the housing is introduced, FIGS. 9C and 9D. FIG. 9 thus summarizes the experimental evidence that the inventive enclosure functions as predicted.

Experimentation showed that when the enclosure wall surfaces are located approximately coincident with the position of the first null, the intensity of the main beam is largely unaffected. Thus, the phased array operates better within the enclosure than in free air. The wall surfaces could be located somewhat closer to the central axis of the beams, which would reduce the overall beam power, but may be acceptable, depending upon the application. Alternatively, locating the beams somewhat further from the axis would cause the inclusion of wake rings, which would also degrade performance, but may be acceptable, again depending on the application.

Figure 11A:
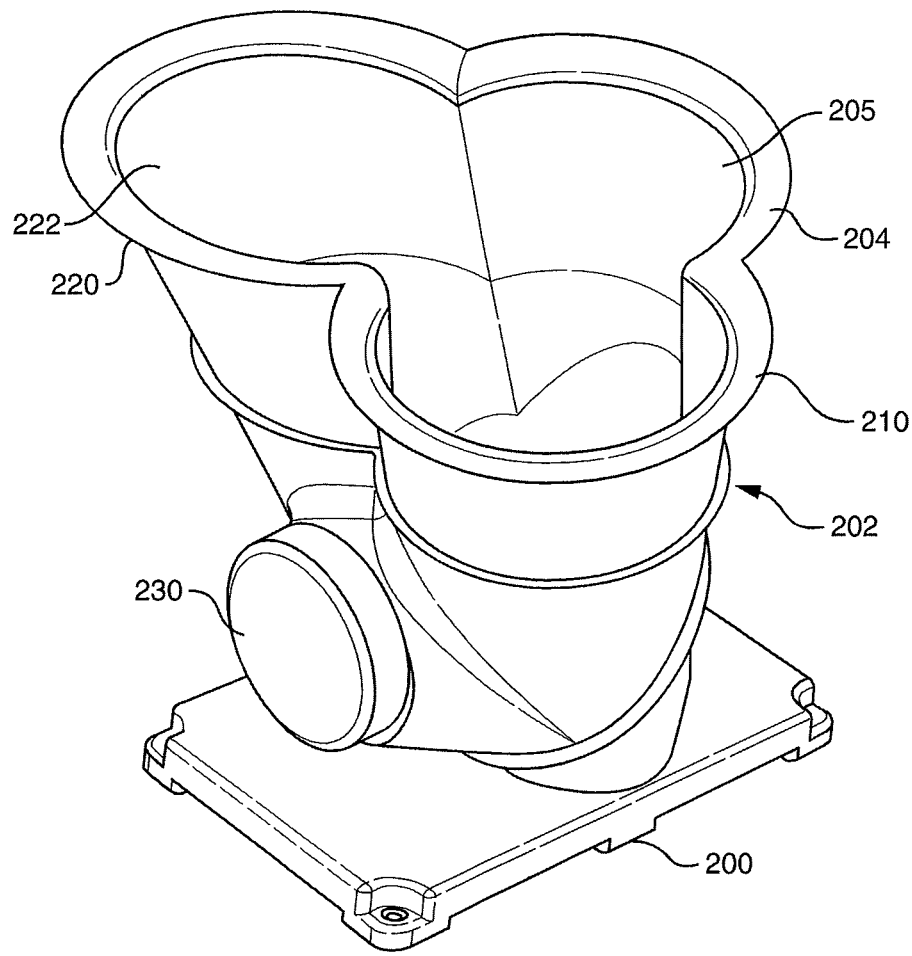
FIGS. 11A and 11B are perspective and top views, respectively, of an alternative embodiment of the inventive housing.
Figure 11B:
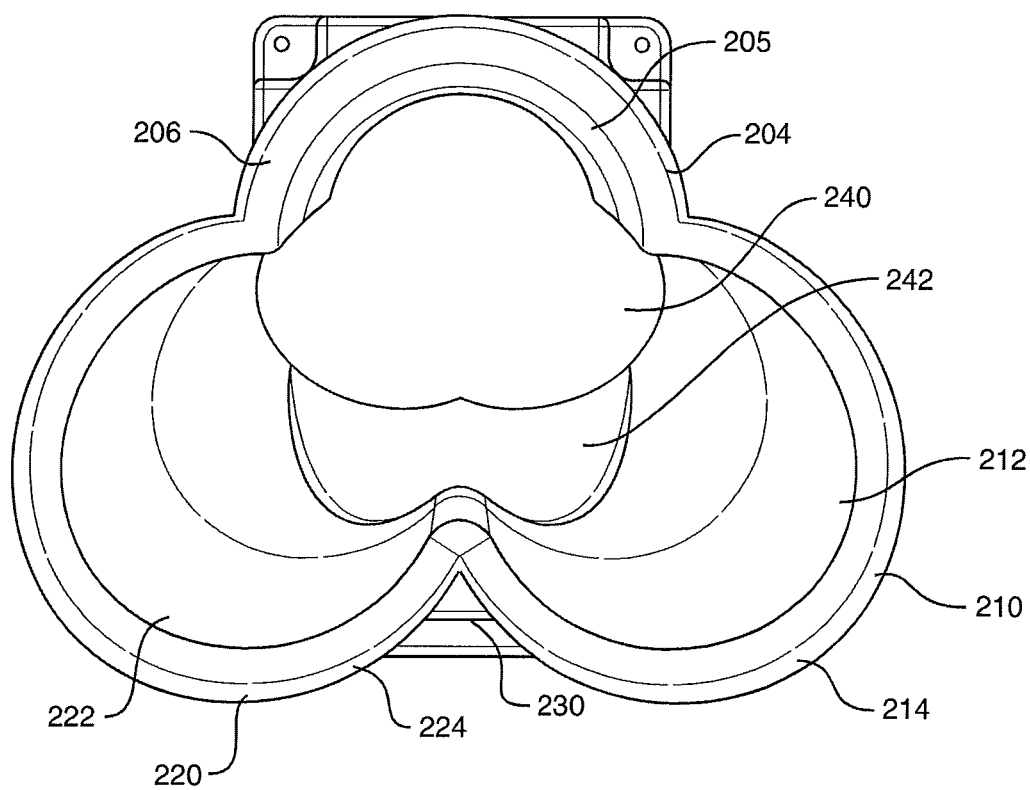

An alternative housing is depicted in FIGS. 11A and 11B. Housing 200 comprises three-walled enclosure 202 that is adapted for use with a rectangular grid transducer array that is located behind door 230, directly facing reflective surface 240; the array is operated so as to emit three sequential beams, one normal to the plane of the array, and two tilted in altitude relative to the array and 90 degrees from one another in azimuth. Housing segment 204 with interior wall surface 205 circumscribes about half of the normal beam, while segment 210 with interior wall 212, and segment 220 with interior wall 222, each circumscribe a little more than half of each of the two tilted beams. Each such wall is partially conical. Lip segment 206 of housing segment 204 is partially circular, while lip segments 214 and 224 of housing segments 210 and 220 are each partially elliptical. Further, these drawings illustrate lips that are flared rather than rounded, and the use of felt lining on both the wall surfaces and the lip surfaces.

The preferred felt sound absorbing fabric material was tested for environmental durability as follows. An approximately 3 inch square sample of the felt material was affixed to a vertical south facing surface exposed to the weather in Amherst, Mass. This sample showed no visible or tactile signs of deterioration over a one-year period. A similar sample of acoustic foam such as Type AF-1 polyurethane foam from Acoustical Solutions Inc. mounted adjacent showed significant deterioration. The surface of the foam became brittle to a depth of about 1/10" from the surface. Gently touching this surface layer caused it to crumble into a fine powder. The brittle surface layer developed within a few weeks of exposure. It appears as though this layer protects the underlying foam from further degradation, until it is brushed off. Once brushed off, a new brittle layer develops within a few weeks. The poor performance of the foam at the test site is likely better than what would be expected at potential sites for the sodar apparatus, where wind and other environmental factors might cause the brittle layer to slough off without ever becoming thick enough to protect the underlying foam. Testing confirms that the felt is suitable for long-term outdoor exposure, while acoustic foam is not.

Also, the sound absorbing qualities of the preferred material and alternative materials that were likely to resist weathering were tested. The materials chosen for testing were a combination of materials manufactured to be sound absorbent, as well other available materials that might be expected to have suitable sound absorbent and water shedding properties that are important for the housing lining material used in the invention. The materials tested were:

1. Truck bed liner fabric: An approximately 1/4" thick pile fabric woven from coarse polyester fiber supplied by Wise Industries of Old Hickory, Tenn., normally used as the exposed surface of their "Bedrug" brand name pickup truck bed liners.
2. Sintered Glass tiles: 1" thick "Reapor" brand name sound absorbent sintered glass tiles manufactured by RPG Diffusor Systems, Inc of Upper Marlboro, Md.
3. Fiberglass insulation material: 1" thick uncoated fiberglass sheet sold as a sound absorbing material; McMaster-Carr Stock #55075T21.
4. Natural fiber welcome mat: A natural fiber (probably jute) woven welcome mat purchased from a local home-improvement store.
5. Heavy welcome mat cut: A natural fiber (probably jute) deep cut pile welcome mat purchased from a local home improvement store.
6. 1/2" thick white "felt": This is the material used in the preferred embodiment herein. It is a non woven fabric (a felt material) made from polyester fibers of varying diameters and provided by National Nonwovens Inc. of Easthampton, Mass.
7. Vee foam: "Auralex Studiofoam Wedges" brand name acoustic foam supplied by True Sound Control Division of Metro Music, Bayville, N.J.

The measured amplitudes of reflected 4425 Hz tones from test materials were compared with reflections from a non-absorptive surface. The following Table 1 summarizes the test results:

TABLE 1

| Description of reflector surface material | Approximate Thickness (inches) | Normalized Reflected Signal |
|---|---|---|
| Bare reflector (non absorptive) | n/a | 1.00 |
| Single layer "truck bed liner" fabric | 0.2 | 0.87 |
| Two layers "truck bed liner" fabric | 0.4 | 0.71 |
| Three layers "truck bed liner" fabric | 0.6 | 0.54 |
| Sintered glass tiles | 1 | 0.51 |
| Fiberglass insulation material | ~1 | 0.46 |
| Four layers "truck bed liner" fabric | 0.8 | 0.43 |
| Light natural-fiber "welcome mat" | ~0.8 | 0.43 |
| Five layers "truck bed liner" fabric | 1 | 0.41 |
| Six layers "truck bed liner" fabric | 1.2 | 0.40 |
| Seven layers "truck bed liner" fabric | 1.4 | 0.38 |
| Heavy welcome mat cut | ~1.2 | 0.35 |
| Single layer 1/2" white felt | 0.5 | 0.34 |
| Eight layers "truck bed liner" fabric | 1.6 | 0.33 |
| Heavy natural-fiber "welcome mat" | ~1.2 | 0.25 |
| Two layers 1/2" white felt | 1 | 0.21 |
| Vee foam flat side up, alone | ~1 | 0.15 |
| Vee foam flat side up, on top of "truck bed liner" fabric | ~1.2 | 0.14 |
| Three layers 1/2" white felt | 1.5 | 0.11 |
| Vee foam flat side up, alone | 2 | 0.07 |
| Four layers 1/2" white felt | 2 | 0.06 |

Experimental Notes:
1. Measured reflected signal, normalized to signal with bare reflector—about 17 Volts AC microphone output.
2. Sound source: 32-element tweeter array, all tweeters driven in parallel. (Approximately 20° beam)
3. Source frequency: 4425 Hz.
4. Subsequent testing showed that the three layers of 1/2" white felt served as an excellent proxy in the above testing for the 1 1/2" thick white felt.

There are several pertinent findings:
  Certain materials that are industrially rated for good broadband sound absorption are not as effective as expected at the test frequency, which is typical in sodar use. (e.g. fiberglass, sintered glass.)
  Sound absorption effectiveness increased with increasing material thickness. Performance improvement diminished at greater thicknesses. See FIG. 12, which is a plot of the sound-absorbing performance of one or more plies of the one-half inch thick white felt material.
  The felt, made up of several diameters of polyester fiber, performed almost as well by thickness as high quality sound absorbing foam.

Figure 12:
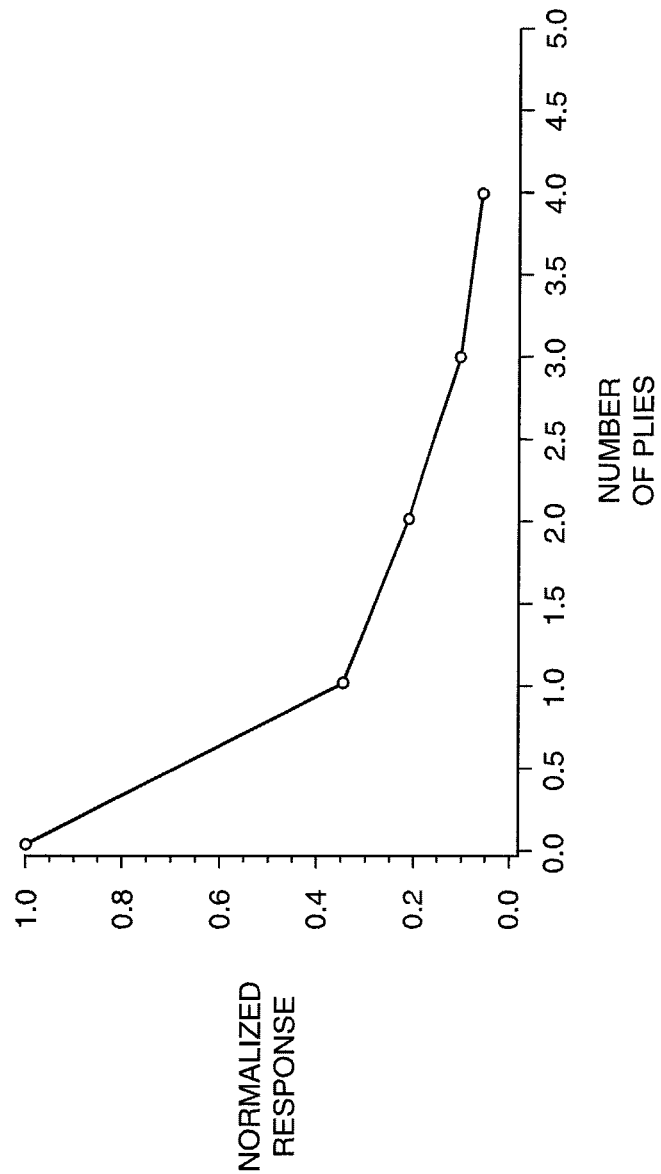
FIG. 12 is a graph showing signal attenuation versus number of one-half inch plies, from testing of the sound-absorbing material used in an embodiment of the invention.

The results of testing of the preferred white felt material are depicted in FIG. 12, which shows that 1.5" of the material (three, 0.5" layers) reduced sound reflection by about 89%.

The felt was tested for water retention and acoustic performance in different stages of saturation with water, to reflect outdoor conditions. It was found that:
  When nearly vertical, the felt drained water rapidly from fully saturated to merely damp. When used with the preferred enclosure described herein, the material will be on a surface that is about ten degrees from the vertical.
  Draining would abruptly stop when the visible water level (corresponding to the level below which the void space in the felt was essentially water saturated) in the felt dropped to about an inch up from the bottom of the material.
  The amount of water retained in the felt was reducible by orienting the felt such that it did not have a horizontal bottom edge. For example, by rotating a vertical square sample of the felt such that one of its corners was pointing straight down, the felt drained water until its visible level dropped to about an inch from this corner.

The amount of water retained after draining in this rotated vertical position was about the same as the weight of the felt.

The residual retained water in the damp felt disappeared slowly by evaporation.

The damp felt's sound absorbing qualities (at 4425 Hz) were not reduced by more than 25% from its dry state.

An assembly of multiple pieces of felt material in edge-to-edge contact performed in the above respects as if the assembly were a single piece of felt. Water drained rapidly from all pieces, collecting only in the bottom of the lowest piece of felt in the contiguous assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A housing for a phased array monostatic sodar system with a transducer array that sequentially emits and receives a set of sound beams along different primary axes, the housing comprising:
   an enclosure having a plurality of sidewalls, each sidewall of the plurality of sidewalls having an inner surface, the enclosure configured to emit and receive the set of sound beams; and
   each inner surface of each sidewall of the plurality of sidewalls defining at least a partially elliptical cross-section configured to substantially envelop at least a portion of an angled, conical sound beam of the set of sound beams.

2. The housing of claim 1, wherein the enclosure comprises a lip extending along a top portion of the plurality of sidewalls, the lip being rounded relative to a longitudinal axis of the lip.

3. The housing of claim 2, wherein the lip defines a substantially circular cross-section relative to the longitudinal axis.

4. The housing of claim 1, further comprising a sound absorbent material disposed on at least a portion of the inner surface of the enclosure, the sound absorbent material facing an interior volume defined by the plurality of sidewalls.

5. The housing of claim 3, wherein a radius of curvature for the lip is at least equal to a wavelength of a sound beam of the set of sound beams.

6. The housing of claim 1, wherein the plurality of sidewalls comprises a set of three sidewalls.

7. The housing of claim 6, wherein each inner surface of each sidewall of the plurality of sidewalls defining at least a partially elliptical cross-section comprises each inner surface of each sidewall of the set of three sidewalls defining a lobe, each lobe being spaced at about 120° from an adjacent lobe about a central vertical axis of the enclosure.

8. The housing of claim 7, wherein each inner surface of each lobe is disposed at about the location of a null of a corresponding sound beam of the set of sound beams.

9. The housing of claim 8, wherein the null of each corresponding sound beam of the set of sound beams is disposed at a location that is about ten degrees from a corresponding main axis of the corresponding sound beam of the set of sound beams.

10. The housing of claim 6, wherein the enclosure comprises a lip extending along a top portion of the set of three sidewalls, the lip being rounded relative to a longitudinal axis of the lip.

11. The housing of claim 10, wherein the lip defines a substantially circular cross-section relative to the longitudinal axis.

12. A system, comprising:
   a transducer array configured to emit and receive a set of sound beams along different primary axes; and
   an enclosure configured to house the transducer array, the enclosure having a plurality of sidewalls, each sidewall of the plurality of sidewalls having an inner surface and each inner surface of each sidewall of the plurality of sidewalls defining at least a partially elliptical cross-section configured to substantially envelop at least a portion of an angled, conical sound beam of the set of sound beams.

13. The system of claim 12, wherein the enclosure comprises a lip extending along a top portion of the plurality of sidewalls, the lip being rounded relative to a longitudinal axis of the lip.

14. The system of claim 13, wherein the lip defines a substantially circular cross-section relative to the longitudinal axis.

15. The system of claim 12, further comprising a sound absorbent material disposed on at least a portion of the inner surface of the enclosure, the sound absorbent material facing an interior volume defined by the plurality of sidewalls.

16. The housing of claim 14, wherein a radius of curvature for the lip is at least equal to a wavelength of a sound beam of the set of sound beams.

17. The system of claim 12, wherein the plurality of sidewalls comprises a set of three sidewalls.

18. The system of claim 17, wherein each inner surface of each sidewall of the plurality of sidewalls defining at least a partially elliptical cross-section comprises each inner surface of each sidewall of the set of three sidewalls defining a lobe, each lobe being spaced at about 120° from an adjacent lobe about a central vertical axis of the enclosure.

19. The system of claim 18, wherein each inner surface of each lobe is disposed at about the location of a null of a corresponding sound beam of the set of sound beams.

20. The system of claim 19, wherein the null of each corresponding sound beam of the set of sound beams is disposed at a location that is about ten degrees from a corresponding main axis of the corresponding sound beam of the set of sound beams.

* * * * *